US011888180B2

United States Patent
Findlay et al.

(10) Patent No.: US 11,888,180 B2
(45) Date of Patent: Jan. 30, 2024

(54) MULTILAYERED FLEXIBLE BATTERY INTERCONNECTS AND METHODS OF FABRICATING THEREOF

(71) Applicant: CelLink Corporation, San Carlos, CA (US)

(72) Inventors: Will Findlay, San Carlos, CA (US); Mark Terlaak, San Carlos, CA (US); Kevin Michael Coakley, Belmont, CA (US); Malcolm Parker Brown, Mountain View, CA (US); Emily Hernandez, Belmont, CA (US)

(73) Assignee: CelLink Corporation, San Carlos, CA (US)

( * ) Notice: Subject to any disclaimer, the term of this patent is extended or adjusted under 35 U.S.C. 154(b) by 0 days.

(21) Appl. No.: 18/352,466

(22) Filed: Jul. 14, 2023

(65) Prior Publication Data

US 2023/0361434 A1    Nov. 9, 2023

Related U.S. Application Data

(63) Continuation of application No. 17/656,370, filed on Mar. 24, 2022.
(Continued)

(51) Int. Cl.
*H01M 50/526* (2021.01)
*H01M 50/533* (2021.01)
(Continued)

(52) U.S. Cl.
CPC ......... *H01M 50/526* (2021.01); *H01M 50/50* (2021.01); *H01M 50/502* (2021.01);
(Continued)

(58) Field of Classification Search
CPC ............ H01M 50/284; H01M 50/287; H01M 50/526; H01M 50/50; H01M 50/502;
(Continued)

(56) References Cited

U.S. PATENT DOCUMENTS

| | | |
|---|---|---|
| 3,750,278 A | 8/1973 | Oberg et al. |
| 3,864,169 A | 2/1975 | Cestaro et al. |

(Continued)

FOREIGN PATENT DOCUMENTS

| | | |
|---|---|---|
| CN | 101199242 B | 7/2012 |
| CN | 203715762 U | 7/2014 |

(Continued)

OTHER PUBLICATIONS

"*Cellink Corp. v. Manaflex LLC*—Answer and Counterclaims", Case No. 4:23-cv-04231-HSG, Nov. 15, 2023.
(Continued)

*Primary Examiner* — Pamela H Weiss
*Assistant Examiner* — Amanda Rosenbaum
(74) *Attorney, Agent, or Firm* — Polygon IP, LLP

(57) ABSTRACT

Provided are multilayered flexible battery interconnects for interconnecting batteries in battery packs and methods of fabricating thereof. A multilayered flexible battery interconnect comprises insulating layers and two conductive layers, stacked together and positioned between the insulating layers. One conductive layer is thicker than the other. The thinner conductive layer comprises flexible tabs for connecting to batteries and, in some examples, comprises voltage sense traces. The smaller thickness of these flexible tabs ensures welding quality and allows using less energy during welding. The battery cell contacts, to which these flexible tabs are welded, can be significantly thicker. Furthermore, the smaller thickness enables fusible link integration into flexible tabs. At the same time, the two conductive layers
(Continued)

collectively conduct current within the interconnect, with the thicker layer enhancing the overall current-carrying capacity. The two conductive layers can be welded together to ensure electric connections and mechanical support.

24 Claims, 27 Drawing Sheets

Related U.S. Application Data

(60) Provisional application No. 63/237,333, filed on Aug. 26, 2021, provisional application No. 63/165,582, filed on Mar. 24, 2021.

(51) Int. Cl.
| | |
|---|---|
| *H01M 50/50* | (2021.01) |
| *H01M 50/503* | (2021.01) |
| *H01M 50/555* | (2021.01) |
| *H01M 50/522* | (2021.01) |
| *H01M 50/516* | (2021.01) |
| *H01M 50/502* | (2021.01) |
| *H01M 50/569* | (2021.01) |

(52) U.S. Cl.
CPC ....... *H01M 50/516* (2021.01); *H01M 50/522* (2021.01); *H01M 50/533* (2021.01); *H01M 50/569* (2021.01); *H01M 50/503* (2021.01); *H01M 50/555* (2021.01)

(58) Field of Classification Search
CPC ............. H01M 50/503; H01M 50/507; H01M 50/509; H01M 50/514; H01M 50/519; H01M 50/536; H01M 50/516; H01M 50/533; H01M 50/569; H01M 50/555; H01M 10/425; H01M 10/4271
See application file for complete search history.

(56) References Cited

U.S. PATENT DOCUMENTS

| | | | |
|---|---|---|---|
| 3,870,212 A | 3/1975 | Polk | |
| 4,047,457 A | 9/1977 | Stubbings | |
| 4,147,337 A | 4/1979 | Bolza-Schunemann | |
| 4,818,840 A | 4/1989 | Booth et al. | |
| 4,908,337 A | 3/1990 | Treffer | |
| 5,158,842 A | 10/1992 | McHenry | |
| 5,262,594 A | 11/1993 | Edwin et al. | |
| 5,354,629 A | 10/1994 | Kuroda et al. | |
| 5,622,652 A | 4/1997 | Kucherovsky et al. | |
| 5,645,932 A | 7/1997 | Uchibori | |
| 5,656,081 A | 8/1997 | Isen et al. | |
| 5,708,297 A | 1/1998 | Clayton | |
| 5,796,588 A | 8/1998 | Machida et al. | |
| 5,866,942 A | 2/1999 | Suzuki et al. | |
| 6,010,771 A | 1/2000 | Isen et al. | |
| 6,036,809 A | 3/2000 | Kelly et al. | |
| 6,042,966 A | 3/2000 | Cheu | |
| 6,214,444 B1 | 4/2001 | Uchibori | |
| 6,284,405 B2 | 9/2001 | Kaido et al. | |
| 6,331,678 B1 | 12/2001 | Wang et al. | |
| 6,332,909 B1 | 12/2001 | Teshima et al. | |
| 6,370,019 B1 | 4/2002 | Matthies et al. | |
| 6,383,616 B1 | 5/2002 | Uchibori | |
| 6,632,538 B1 | 10/2003 | Yamazaki et al. | |
| 6,787,732 B1 | 9/2004 | Xuan et al. | |
| 6,881,923 B2 | 4/2005 | Battaglia | |
| 6,972,544 B2 | 12/2005 | Seman, Jr. et al. | |
| 6,992,001 B1 | 1/2006 | Lin | |
| 7,497,004 B2 | 3/2009 | Cote et al. | |
| 7,633,035 B2 | 12/2009 | Kirmeier | |
| 7,686,853 B2 | 3/2010 | Seman, Jr. et al. | |
| 8,143,631 B2 | 3/2012 | Crandell et al. | |
| 8,236,443 B2 | 8/2012 | Snyder et al. | |
| 8,404,376 B2 | 3/2013 | Snyder et al. | |
| 8,414,308 B1 | 4/2013 | Meyers | |
| 8,426,063 B2 | 4/2013 | Lin | |
| 8,475,954 B2 | 7/2013 | Ijaz et al. | |
| 8,497,037 B2 | 7/2013 | Hosoe et al. | |
| 8,510,934 B2 | 8/2013 | Brand et al. | |
| 8,635,761 B2 | 1/2014 | Wu | |
| 8,913,368 B2 | 12/2014 | Hosoe et al. | |
| 8,920,955 B1 | 12/2014 | Chuang et al. | |
| 8,931,166 B2 | 1/2015 | Marttila | |
| 8,975,510 B2 | 3/2015 | Coakley | |
| 9,147,875 B1 | 9/2015 | Coakley et al. | |
| 9,214,607 B1 | 12/2015 | Andrews | |
| 9,343,595 B2 | 5/2016 | Fu et al. | |
| 9,466,777 B2 | 10/2016 | Coakley et al. | |
| 9,545,010 B2 | 1/2017 | Coakley et al. | |
| 9,671,352 B2 | 6/2017 | Woo et al. | |
| 9,692,030 B2 | 6/2017 | Schüssler et al. | |
| 9,730,333 B2 | 8/2017 | Li et al. | |
| 10,008,403 B2 | 6/2018 | Rumsby | |
| 10,153,570 B2 | 12/2018 | Coakley et al. | |
| 10,211,443 B2 | 2/2019 | Coakley et al. | |
| 10,383,207 B2 | 8/2019 | Coakley et al. | |
| 10,694,618 B2 | 6/2020 | Coakley et al. | |
| 11,108,175 B2 | 8/2021 | Coakley et al. | |
| 11,116,070 B2 | 9/2021 | Coakley et al. | |
| 11,545,773 B2 | 1/2023 | Coakley et al. | |
| 11,791,577 B2 | 10/2023 | Coakley et al. | |
| 2001/0006766 A1 | 7/2001 | O'Brien et al. | |
| 2001/0012588 A1 | 8/2001 | Kaido et al. | |
| 2002/0025416 A1 | 2/2002 | Uchibori | |
| 2002/0046856 A1 | 4/2002 | Alcoe | |
| 2002/0050489 A1 | 5/2002 | Ikegami et al. | |
| 2003/0062347 A1 | 4/2003 | Song et al. | |
| 2003/0143958 A1 | 7/2003 | Michael et al. | |
| 2004/0261700 A1 | 12/2004 | Edwards et al. | |
| 2006/0032665 A1 | 2/2006 | Ice | |
| 2006/0213548 A1 | 9/2006 | Bachrach et al. | |
| 2007/0171129 A1 | 7/2007 | Coleman et al. | |
| 2007/0193027 A1 | 8/2007 | Takakusaki et al. | |
| 2008/0017971 A1 | 1/2008 | Hollis | |
| 2008/0083715 A1 | 4/2008 | Kirmeier | |
| 2008/0128397 A1 | 6/2008 | Gandhi | |
| 2008/0196930 A1 | 8/2008 | Tuominen et al. | |
| 2008/0216887 A1 | 9/2008 | Hacke et al. | |
| 2009/0007421 A1 | 1/2009 | Chen et al. | |
| 2009/0022885 A1 | 1/2009 | Matsumoto et al. | |
| 2009/0045964 A1 | 2/2009 | Takeda et al. | |
| 2009/0111015 A1 | 4/2009 | Wood et al. | |
| 2009/0139781 A1 | 6/2009 | Straubel | |
| 2009/0233237 A1 | 9/2009 | Yoshiki et al. | |
| 2009/0250104 A1 | 10/2009 | Inoue et al. | |
| 2010/0031996 A1 | 2/2010 | Basol | |
| 2010/0271223 A1 | 10/2010 | Ohkura et al. | |
| 2011/0001670 A1 | 1/2011 | Coleman et al. | |
| 2011/0089212 A1 | 4/2011 | Schmid et al. | |
| 2011/0177365 A1 | 7/2011 | Yasui et al. | |
| 2012/0034497 A1 | 3/2012 | Hermann et al. | |
| 2012/0088140 A1 | 4/2012 | Kardasz et al. | |
| 2012/0129014 A1* | 5/2012 | Baek .................. | H01M 50/119 429/7 |
| 2012/0164490 A1 | 6/2012 | Itoi et al. | |
| 2012/0171527 A1 | 7/2012 | Hiroma | |
| 2012/0183823 A1 | 7/2012 | Von et al. | |
| 2012/0227907 A1 | 9/2012 | Arakawa et al. | |
| 2012/0240995 A1 | 9/2012 | Coakley | |
| 2012/0288757 A1 | 11/2012 | Hosoe et al. | |
| 2013/0004844 A1 | 1/2013 | Hosoe et al. | |
| 2013/0004856 A1 | 1/2013 | Hosoe et al. | |
| 2013/0055555 A1 | 3/2013 | Forster et al. | |
| 2013/0078485 A1 | 3/2013 | Muis | |
| 2013/0089769 A1 | 4/2013 | Proctor et al. | |
| 2013/0098424 A1 | 4/2013 | Tsuda et al. | |
| 2013/0112233 A1 | 5/2013 | Coakley | |
| 2013/0228890 A1 | 9/2013 | Eisele | |
| 2013/0260191 A1 | 10/2013 | Takahashi et al. | |
| 2013/0291375 A1 | 11/2013 | Virtanen et al. | |
| 2013/0307133 A1 | 11/2013 | Toba | |

(56) References Cited

U.S. PATENT DOCUMENTS

| | | |
|---|---|---|
| 2014/0061877 A1 | 3/2014 | Lin et al. |
| 2014/0199562 A1 | 7/2014 | Kim et al. |
| 2014/0212695 A1 | 7/2014 | Lane et al. |
| 2014/0234683 A1 | 8/2014 | Sweney |
| 2014/0268780 A1 | 9/2014 | Wang et al. |
| 2014/0285990 A1 | 9/2014 | Kim et al. |
| 2014/0335705 A1 | 11/2014 | Fan et al. |
| 2015/0023584 A1 | 1/2015 | Rudin |
| 2015/0050525 A1 | 2/2015 | Ahn et al. |
| 2015/0201489 A1* | 7/2015 | Foong .......... H05K 3/007 361/783 |
| 2015/0228956 A1 | 8/2015 | Schüssler et al. |
| 2015/0270190 A1 | 9/2015 | Kim et al. |
| 2016/0073506 A1* | 3/2016 | Coakley .......... H01M 50/522 156/60 |
| 2016/0181579 A1 | 6/2016 | Geshi et al. |
| 2016/0207287 A1 | 7/2016 | Kim |
| 2016/0225969 A1 | 8/2016 | Coakley et al. |
| 2016/0315304 A1 | 10/2016 | Biskup |
| 2016/0366768 A1 | 12/2016 | Matsuda |
| 2017/0012331 A1 | 1/2017 | Ng et al. |
| 2017/0034902 A1 | 2/2017 | Coakley et al. |
| 2017/0069940 A1 | 3/2017 | Goldstein et al. |
| 2017/0077487 A1 | 3/2017 | Coakley et al. |
| 2017/0094802 A1 | 3/2017 | Coakley et al. |
| 2017/0214033 A1 | 7/2017 | Takano et al. |
| 2018/0034023 A1 | 2/2018 | Newman et al. |
| 2018/0190960 A1* | 7/2018 | Harris .......... H01M 10/613 |
| 2018/0205048 A1 | 7/2018 | Enomoto et al. |
| 2018/0294536 A1 | 10/2018 | Kruszelnicki |
| 2019/0097204 A1 | 3/2019 | Liposky et al. |
| 2019/0181419 A1 | 6/2019 | Suba et al. |
| 2019/0218142 A1 | 7/2019 | Logunov et al. |
| 2019/0296281 A1 | 9/2019 | Elsberry |
| 2019/0312251 A1 | 10/2019 | Matthews |
| 2019/0341585 A1 | 11/2019 | Shi et al. |
| 2020/0020918 A1* | 1/2020 | Ichikawa .......... H01M 50/507 |
| 2020/0220120 A1 | 7/2020 | Day et al. |
| 2020/0295338 A1 | 9/2020 | Xiang et al. |
| 2022/0109256 A1 | 4/2022 | Coakley et al. |
| 2022/0311103 A1 | 9/2022 | Findlay et al. |

FOREIGN PATENT DOCUMENTS

| | | |
|---|---|---|
| CN | 103988283 A | 8/2014 |
| CN | 107078263 B | 4/2019 |
| CN | 116897463 A | 10/2023 |
| EP | 2461408 A1 | 6/2012 |
| EP | 3192111 B1 | 12/2018 |
| EP | 3496180 A1 | 6/2019 |
| EP | 4256647 A1 | 10/2023 |
| JP | 2007508681 A | 4/2007 |
| JP | 2011233491 A | 11/2011 |
| JP | 2012198995 A | 10/2012 |
| JP | 2013037969 A | 2/2013 |
| KR | 20120053809 A | 5/2012 |
| KR | 20150058939 A | 5/2015 |
| KR | 101829178 B1 | 2/2018 |
| WO | 2013063738 A1 | 5/2013 |
| WO | 2016040040 A1 | 3/2016 |
| WO | 2016126890 A1 | 8/2016 |
| WO | 2019150740 A1 | 8/2019 |
| WO | WO2022204709 | 3/2022 |
| WO | 2022204709 A1 | 9/2022 |

OTHER PUBLICATIONS

"*Cellink Corp.* v. *Manaflex LLC*—Complaint for Patent Infringement and Trade Secret Misappropriation", Aug. 18, 2023.

"Int'l Application Serial No. PCT/US2015/047821, Search Report and Written Opinion dated Mar. 14, 2017".

"European Application Serial No. 15840309.7, Search Report dated Oct. 24, 2017", 4 pgs.

"European Application Serial No. 17176834.4, Office Action dated Nov. 24, 2017", 9 pgs.

"International Application Serial No. PCT/US15/47821, International Preliminary Report on Patentability dated Mar. 23, 2017", 6 pages.

"International Application Serial No. PCT/US16/56154, International Search Report and Written Opinion dated Jan. 10, 2017", 12 pages.

"Int'l Application Serial No. PCT/US16/16469, Search Report and Written Opinion dated May 17, 2016", 7 pages.

"Int'l Application Serial No. PCT/US16/56154, IPRP dated Apr. 19, 2018", 9 pages.

"Korean Application Serial No. 10-2017-7009130, Office Action dated Jun. 20, 2017", 13 pgs.

U.S. Appl. No. 16/227,472, Non-Final Rejection, Jul. 2, 2020, 33 pgs.

U.S. Appl. No. 16/227,472, Notice of Allowance and Fees Due (Ptol-85), dated Nov. 20, 2020, 9 pgs.

U.S. Appl. No. 16/227,472, Requirement for Restriction/Election, dated Apr. 3, 2020, 9 pgs.

U.S. Appl. No. 14/671,814, Notice of Allowance dated Jun. 1, 2015, 12 pgs.

U.S. Appl. No. 14/836,946, Notice of Allowance dated Sep. 28, 2016, 10 pgs.

U.S. Appl. No. 15/015,088, Notice of Allowance dated Aug. 3, 2016, 14 pgs.

U.S. Appl. No. 15/015,088, Restriction Requirement dated May 31, 2016, 8 pgs.

U.S. Appl. No. 15/259,518, Notice of Allowance dated Jul. 18, 2017, 16 pgs.

U.S. Appl. No. 15/259,518, Restriction Requirement dated Mar. 22, 2017, 8 pgs.

U.S. Appl. No. 15/289,028, Non Final Office Action dated Apr. 4, 2018, 26 pgs.

U.S. Appl. No. 15/289,028, Notice of Allowance dated Sep. 28, 2018, 10 pgs.

U.S. Appl. No. 15/289,028, Requirement for Restriction dated Sep. 12, 2017, 13 pgs.

U.S. Appl. No. 15/379,177, Ex Parte Quayle Action mailed Jul. 11, 2017, 5 pgs.

U.S. Appl. No. 15/379,177, Notice of Allowance dated Sep. 7, 2017, 8 pgs.

U.S. Appl. No. 18/352,584, Non Final Office Action dated Oct. 26, 2023, 13 pgs.

Chinese Application Serial No. 201580056710.9, Office Action dated Apr. 4, 2018, 6 pgs.

Chinese Application Serial No. 201580056710.9, Office Action dated Oct. 31, 2018, 8 pgs.

Request for Quote (RFQ) email from CelLink, sent Oct. 30, 2015.

Schubert, Gunter, "Adhesion of Aluminium Foil to Coating—Stick with it", Tappi 03/G. Schubert, http://www.tappi.org/content/enewsletters/eplace/2004/10-1schub1.pdf, May 14, 2003.

Zhang, Shengde et al., "Mechanical Properties of Copper Thin Films Used in Electronic Devices", Procedia Engineering 10 (2011) 1497-1502, 20116 pgs.

Nagarajan Palavesam et al; "Roll-to-roll processing of film substrates for hybrid integrated flexible electronics" Flexible and Printed Electronics, Feb. 2018.

\* cited by examiner

MULTILAYERED FLEXIBLE BATTERY INTERCONNECTS AND METHODS OF FABRICATING THEREOF

CROSS-REFERENCE TO RELATED APPLICATIONS

This application is a continuation of U.S. patent application Ser. No. 17/656,370, filed on 2022 Mar. 24, which claims the benefit under 35 U.S.C. § 119(e) of U.S. Provisional Patent Application 63/237,333, filed on 2021 Aug. 26 and U.S. Provisional Patent Application 63/165,582, filed on 2021 Mar. 24 all of which are incorporated herein by reference in their entirety for all purposes.

BACKGROUND

Rechargeable battery cells and battery packs assembled with these cells represent a promising technology for providing energy storage for mobile (e.g., electric vehicles) and stationary (e.g., grid) applications. To increase market penetration, the cost of battery cells and other pack components must decrease. While the cells (e.g., lithium-ion cells and other types of cells) are currently the most expensive components in battery packs, the cell costs are expected to decrease in the future with economies of scale, new materials, and design improvements. Furthermore, the performance and lifetime of the battery cells should increase, leading to new high-durability applications. This trend will place more emphasis on the cost, performance, and reliability of other components in battery packs, in particular, battery interconnect. Furthermore, new efficient methods of assembling battery packs using these components will be needed.

Many conventional battery packs are assembled using bulky metal plates with complex designs and features. These metal plates interconnect individual battery cells and carry electric currents among these cells and/or battery pack terminals. Special fuses and/or connector wires are used for these plates-to-battery cell connections, e.g., to protect the individual cells against over-currents and thermal runaway. These fuses can be fragile and break under stress and vibration conditions, which can be common during packs' operations. Furthermore, each plate is typically a freestanding component, with multiple plates often needed for large battery packs. This individualized assembly drives up the cost and complexity of the battery packs and can negatively impact the safety and robust performance of the battery packs.

SUMMARY

Provided are multilayered flexible battery interconnects for interconnecting batteries in battery packs and methods of fabricating thereof. A multilayered flexible battery interconnect comprises insulating layers and two conductive layers, stacked together and positioned between the insulating layers. One conductive layer is thicker than the other. The thinner conductive layer comprises flexible tabs for connecting to batteries and, in some examples, comprises voltage sense traces. The smaller thickness of these flexible tabs ensures welding quality and allows using less energy during welding. The battery cell contacts, to which these flexible tabs are welded, can be significantly thicker. Furthermore, the smaller thickness enables fusible link integration into flexible tabs. At the same time, the two conductive layers collectively conduct current within the interconnect, with the thicker layer enhancing the overall current-carrying capacity. The two conductive layers can be welded together to ensure electric connections and mechanical support.

BRIEF DESCRIPTION OF THE DRAWINGS

FIG. 7D is a schematic top view of the four prismatic cells in FIG. 7A, illustrating the entire interconnect positioned over the.

DETAILED DESCRIPTION

Figure 1A:
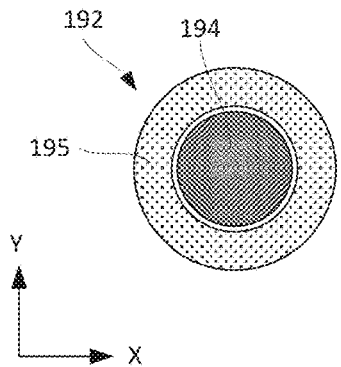
FIG. 1A is a schematic top view of a cylindrical battery cell illustrating the cell's center and edge contacts, in accordance with some examples.

The ensuing detailed description of examples of this disclosure will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one example" are not intended to be interpreted as excluding the existence of additional examples that also incorporate the recited features. Moreover, unless explicitly stated to the contrary, examples "comprising" or "having" an element or a plurality of elements having a particular property may include additional elements not having that property.

Introduction

Many modern battery packs include multiple cells that need to be interconnected. For example, a typical battery pack used in an electric vehicle has thousands of battery cells, such as cylindrical battery cells or, more specifically, 18650 cells, 21700 cells, 4680 cells, and the like. The success of many battery applications often depends on robust, reliable, and inexpensive interconnects among battery cells in such packs. As noted above, some conventional interconnects use rigid metal plates, which can be referred to as bus bars, for connecting to cell contacts. While these bus bars can transmit large currents and can provide some mechanical support, these bus bars are expensive to manufacture. For example, bus bar manufacturing requires unique tooling (for each battery module, which can be expensive. Furthermore, these bus bars are expensive and difficult to connect to the battery cell terminals. The rigidity of these bus bars can interfere with the relative motion of the battery cells and plates and can break electric connections between these components. Finally, the thickness of these bus bars also limits the thermal performance of the pack cooling plate/system, leading to non-optimized specific energy (e.g., lowering the driving range in electric vehicle applications).

Multilayered flexible battery interconnects are specially configured to provide reliable electrical connections and, in many cases, can be easier to manufacture, connect to cell terminals, and fit into battery packs than conventional interconnects. Multilayered flexible battery interconnects also provide electric current fusing functionality as further described below. Unlike conventional printed circuits, which are generally limited to low current applications because of small conductive layer thicknesses, multilayered flexible battery interconnects can be configured to provide any current-carrying capabilities without impacting abilities to weld to battery contact. For example, the thickness of printed conductive elements is limited by mask-and-etch capabilities, which are generally not suitable for high aspect ratio features and thick conductors. Furthermore, the prolonged etching needed for thicker layers drives up the production cost of the flexible circuit. At the same time, many modern battery cells and packs are capable of operating at currents of at least 50 A and even greater than 100 A, such as during a rapid charge or a rapid discharge of the pack. This, in turn, necessitates the use of thick conductive layers (e.g., a thickness of at least 200 micrometers and even at least 500 micrometers) to provide sufficient conductivity.

It should be noted that thick conductive layers present various challenges. First, a thick conductive layer (e.g., having a thickness of greater than 200 micrometers) is hard to weld or otherwise attach to battery cells. Thicker conductive layers require more energy to form weld, which dissipates more heat into battery cells. At the same time, many cell components (e.g., separators, electrolytes) are thermally sensitive and cannot withstand high temperatures (e.g., temperatures greater than 70° C.). Furthermore, thick conductive layers present various challenges when forming fuses/fusible links from these conductors. A fusible link controls and breaks the electric connection to a battery cell when the current through the link exceeds a certain threshold controlled, in part, by the dimensions of this fusible link. For example, etching a thick conductor makes it difficult to achieve a narrow trace having a uniform width. For etching, the minimum width-to-thickness ratio (referred to herein as an "aspect ratio") is typically four or even five, to avoid excessive undercuts associated with etching. For example, when a 200-micrometer thick conductor is etched to form fusible links, the resulting width has to be at least 700-800 micrometers, which may be excessive for most fusing applications/types of battery cells. Furthermore, forming a fusible link that does not contact any other components is generally not possible with etching since the backside must be protected from the etchant. Any physical contact with a fusible link (other than with the remaining portions of the conductor) is not desirable and interferes with the thermal characteristics/overall performance of the fusible link.

Multilayered flexible battery interconnects described herein address various deficiencies of conventional interconnects described above. In some examples, a multilayered flexible battery interconnect comprises two insulating layers (e.g., a first insulating layer and a second insulating layer) and two conductive layers (e.g., a first conductive layer and a second conductive layer). One conductive layer (e.g., the first conductive layer) is thicker than the other (e.g., the second conductive layer). The two conductive layers form a stack, which is at least partially insulated by and sealed between the insulating layers. The thinner conductive layer comprises flexible tabs extending outside the stack and even outside the insulating layers. Specifically, the second conductive layer, being thinner, has flexible tabs (of the same thickness) that allow forming electric connections to the battery cells (e.g., welding) without the need for significant energy/heating of the battery cells. A thinner conductive layer also ensures the quality of the laser weld. For example, a typical cylindrical battery cell has a top can thickness of 0.3 millimeters or 0.4 millimeters. If the conductive layer has the same thicker or thicker than the can thickness, then the weld performance suffers. As such, having a thinner conductive layer welded to a thicker battery can provide a higher-quality weld.

Furthermore, various fusible links can be incorporated right into the flexible tabs. The first conductive layer, being thicker, helps to provide additional current-carrying capabilities through the interconnect. In some examples, the first conductive layer is at least twice thicker than the second conductive layer. As such, the first conductive layer may be the primary current carrier within the multilayered flexible battery interconnect. The thickness of the first conductive layer can be adjusted to change these current-carrying capabilities of the multilayered flexible battery interconnect without changing the thickness of the second conductive layer (and the thickness of the flexible tabs).

For purposes of this disclosure, the term "interconnect" is used interchangeably with "interconnect circuit", the term "conductive layer"—with "conductor" or "conductor layer", and the term "insulating layer"—with "insulator".

Figure 1B:
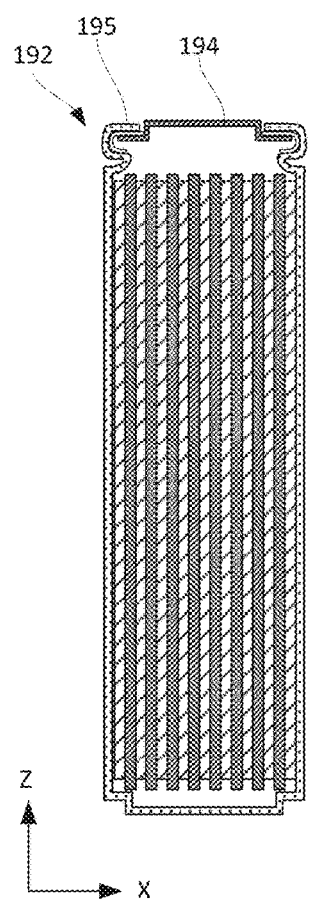
FIG. 1B is a schematic cross-sectional side view of the cylindrical battery cell in FIG. 1A, in accordance with some examples.
Figure 7A:
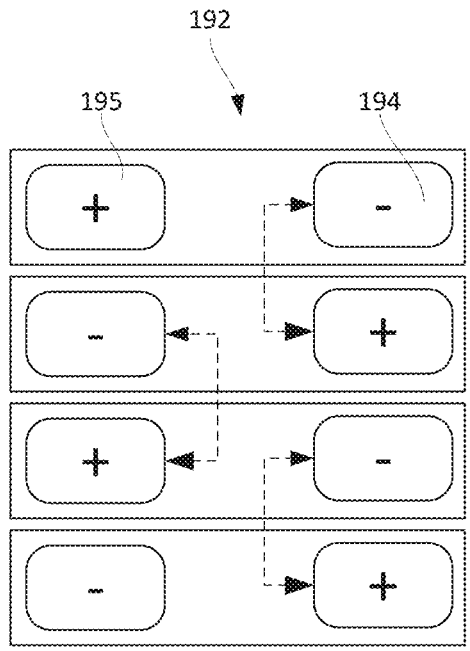
FIG. 7A is a schematic top view of four prismatic cells, illustrating a desired in-series connection of these cells.

In some examples, a multilayered flexible battery interconnect may be used to electrically interconnect a set of battery cells having terminals on the same side of the cells. These cells can be cylindrical cells (e.g., 18650 cells, 21700 cells, 4680 cells, and the like) as schematically shown in FIGS. 1A and 1B or prismatic cells as shown in FIG. 7A and described below. Specifically, FIG. 1A is a schematic top view of cylindrical battery cell 192 illustrating first contact 194 (which may be also referred to as a center contact) and second contact 195 (which may be also referred to as an edge contact, in accordance with some examples. FIG. 1B is a schematic cross-sectional side view of cylindrical battery cell 192 in FIG. 1A, in accordance with some examples.

Figure 1C:
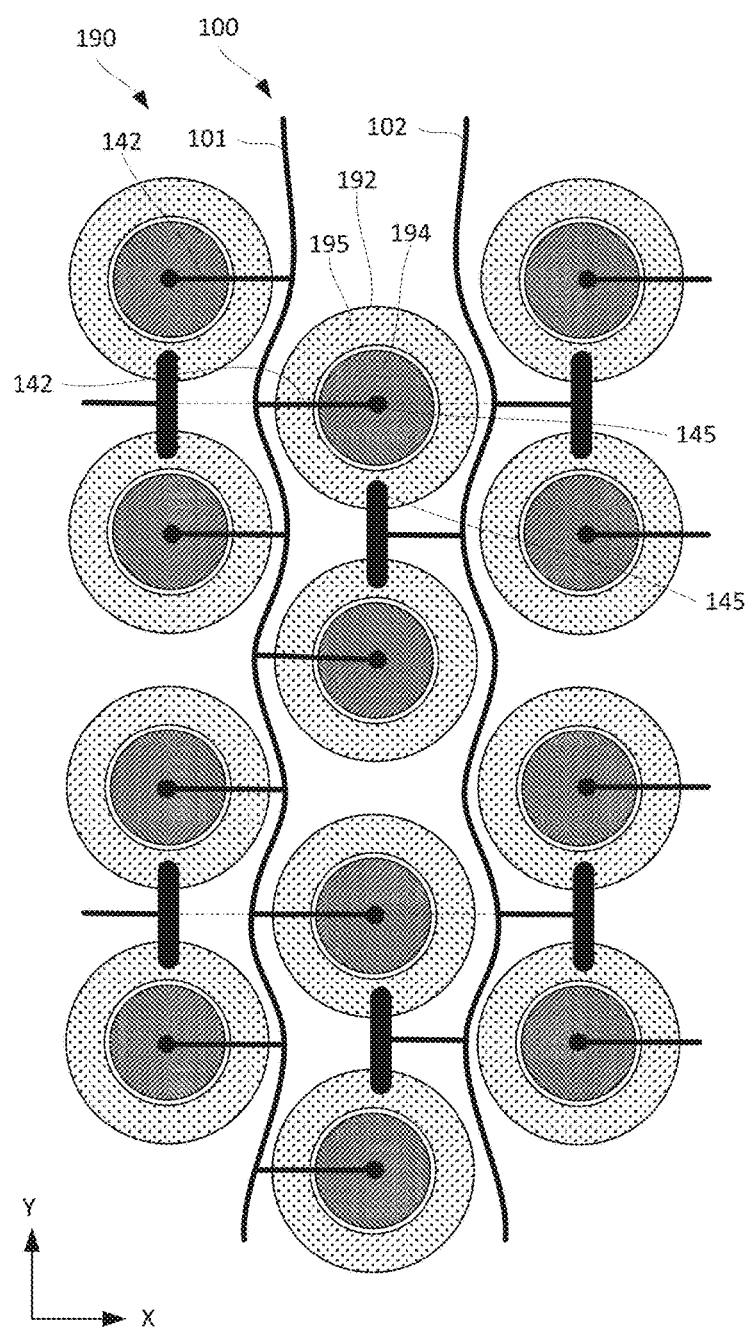
FIG. 1C is a schematic top view of a battery pack comprising multiple battery cells and interconnect, in accordance with some examples.

FIG. 1C is a schematic top view of battery pack 190 comprising multiple battery cells 192 and multilayered flexible battery interconnect 100, forming connections to each battery cell 192, in accordance with some examples. Multilayered flexible battery interconnect 100 is shown in a form of an electrical diagram to illustrate one connection example in battery pack 190. Specifically, in this example of FIG. 1C, multilayered flexible battery interconnect 100 comprises first bus 101 and second bus 102. Each bus is formed by two or more conductive layers as further described below. One of these conductive layers (e.g., a thinner one) also forms flexible tabs 142 that are connected to first contacts 194 and second contacts 195 of battery cells 192. The connections are formed by contact pads 145 positioned at the ends of flexible tabs 142. In this example, first/center contacts 194 of the left row of battery cells 192 are connected to flexible tabs 142 of first bus 101. First/center contacts 194 of the middle row of battery cells 192 are also connected to flexible tabs 142 of first bus 101. As such, all cells 192 in the left and center rows are connected in parallel. Second/edge contacts 195 of the middle row of battery cells 192 are connected to flexible tabs 142 of second bus 102. As such, first bus 101 and second bus 102 are connected in series by the middle row of battery cells 192. It should be noted that each flexible tab 142 of second bus 102 is connected to two adjacent cells 192 in the middle row or, more specifically, to second/edge contacts 195 of two adjacent cells 192 in the middle row. This double-edge contact is possible as second/edge contacts 195 of two adjacent cells 192 are positioned next to each other and can be achieved with the same contact pad 145. The connections to first/center contacts 194 are individual as these contacts are surrounded by second/edge contacts 195 in this example. Finally, second/edge contacts 195 of the right row of battery cells 192 are also connected to flexible tabs 142 of second bus 102. As such, all cells 192 in the right and center rows are connected in parallel.

Figure 1D:
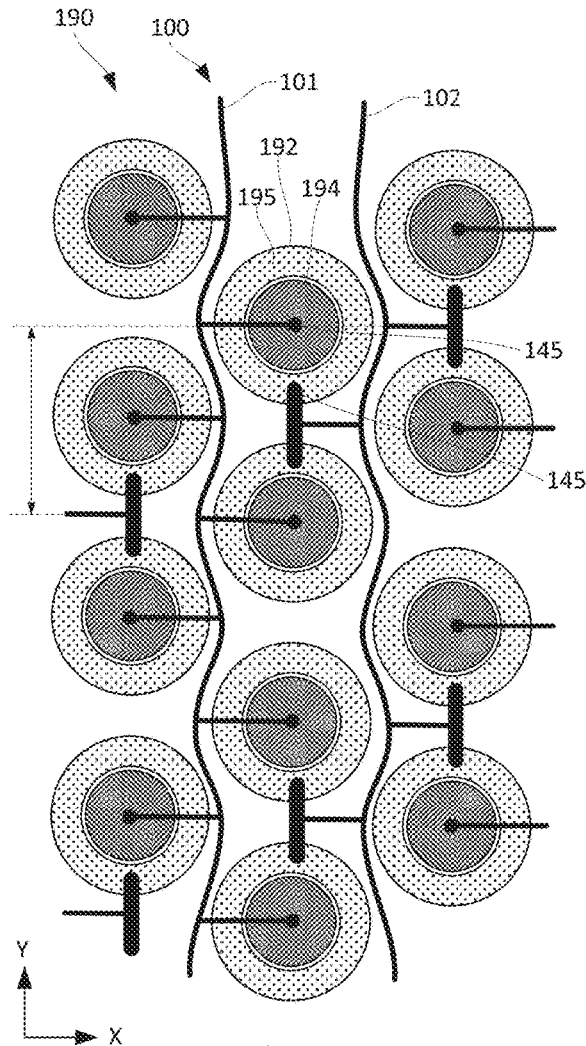
FIGS. 1D and 1E are schematic top views of a battery pack with additional interconnect examples.

FIG. 1D is a schematic top view of battery pack 190 in which battery cells 192 are interconnected with another example of multilayered flexible battery interconnect 100. The connection scheme is the same as in FIG. 1C. The difference is in the position of flexible tabs 142 forming double-edge contacts. Referring to FIG. 1C, flexible tabs 142, which form double-edge contacts to battery cells 192 in the left row and the right row are aligned relative to each other along the X-axis. Now referring to FIG. 1D, flexible tabs 142, which form double-edge contacts to battery cells 192 in the left row and the right row are shifted by a battery pitch along the Y-axis. For purposes of this disclosure, the term "battery pitch" is defined as a distance between the centers of two adjacent batteries positioned in the same row. In the case of cylindrical cells, the battery pitch is equal to the cell diameter plus the gap between two cells in the same row.

Figure 1E:
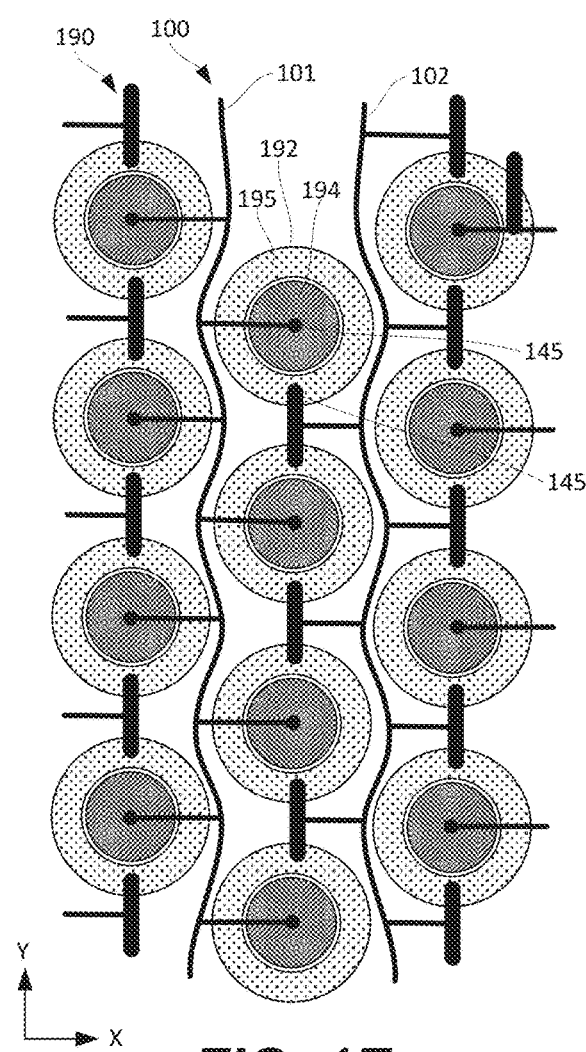

FIG. 1E is a schematic top view of battery pack 190 in which battery cells 192 are interconnected with yet another example of multilayered flexible battery interconnect 100. Again, the connection scheme is the same as in FIG. 1C. However, multilayered flexible battery interconnect 100 in FIG. 1E has more flexible tabs 142 to provide redundant edge contacts. Specifically, each battery cell 192 has two different flexible tabs 142 connected to its second/edge contact 195. This redundancy helps to ensure that all cells remain connected without significant weight and cost penalties.

Examples of Interconnect Circuits and Battery Packs

Figure 2A:
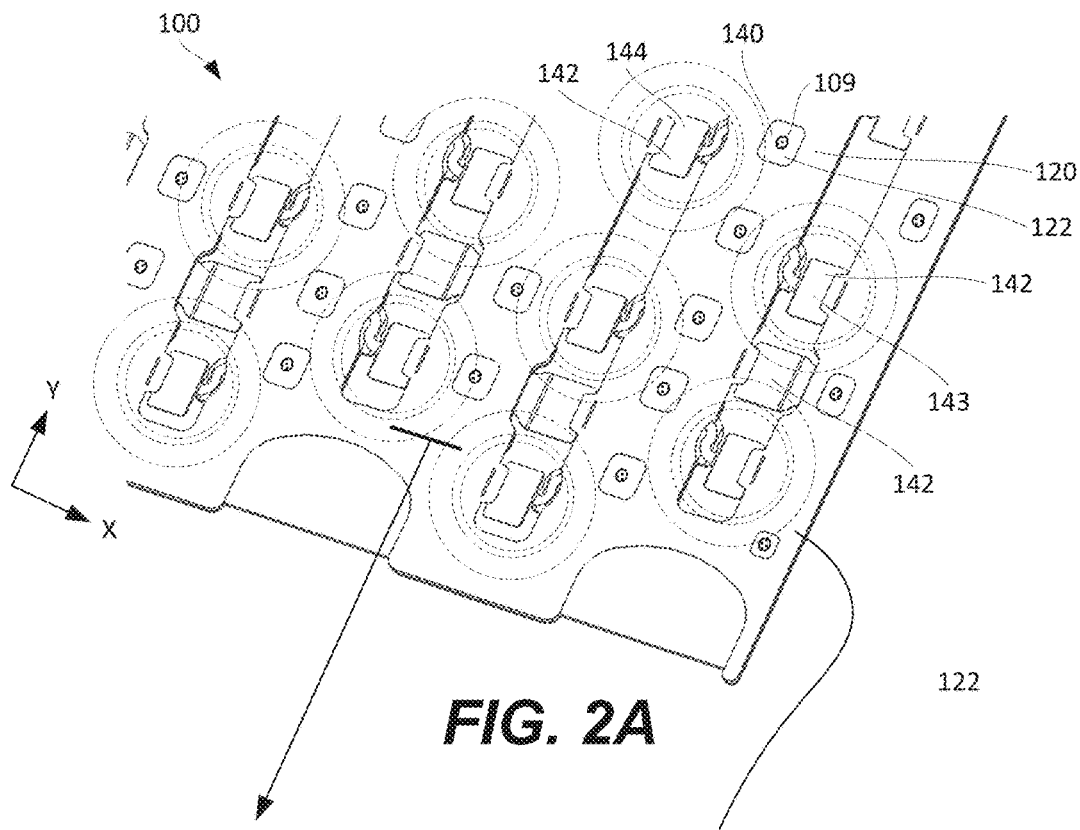
FIG. 2A is a schematic perspective view and a partial cross-sectional view of a multilayered flexible battery interconnect, in accordance with some examples.

FIG. 2A is a schematic perspective view of multilayered flexible battery interconnect 100 for interconnecting battery cells 192 in battery pack 190, in accordance with some examples. Referring to the cross-sectional view in FIG. 2A, multilayered flexible battery interconnect 100 comprises first insulating layer 110, second insulating layer 120, first conductive layer 130, and second conductive layer 140. First conductive layer 130 is disposed between first insulating layer 110 and second insulating layer 120 and directly interfacing first insulating layer 110. Second conductive layer 140 is disposed between and directly interfacing each of first conductive layer 130 and second insulating layer 120. Furthermore, first conductive layer 130 is thicker than second conductive layer 140, i.e., $T_{FCL} > T_{SCL}$. First insulating layer 110, first conductive layer 130, and a large portion of second conductive layer 140 are not visible in the perspective view in FIG. 2A.

Figure 2B:
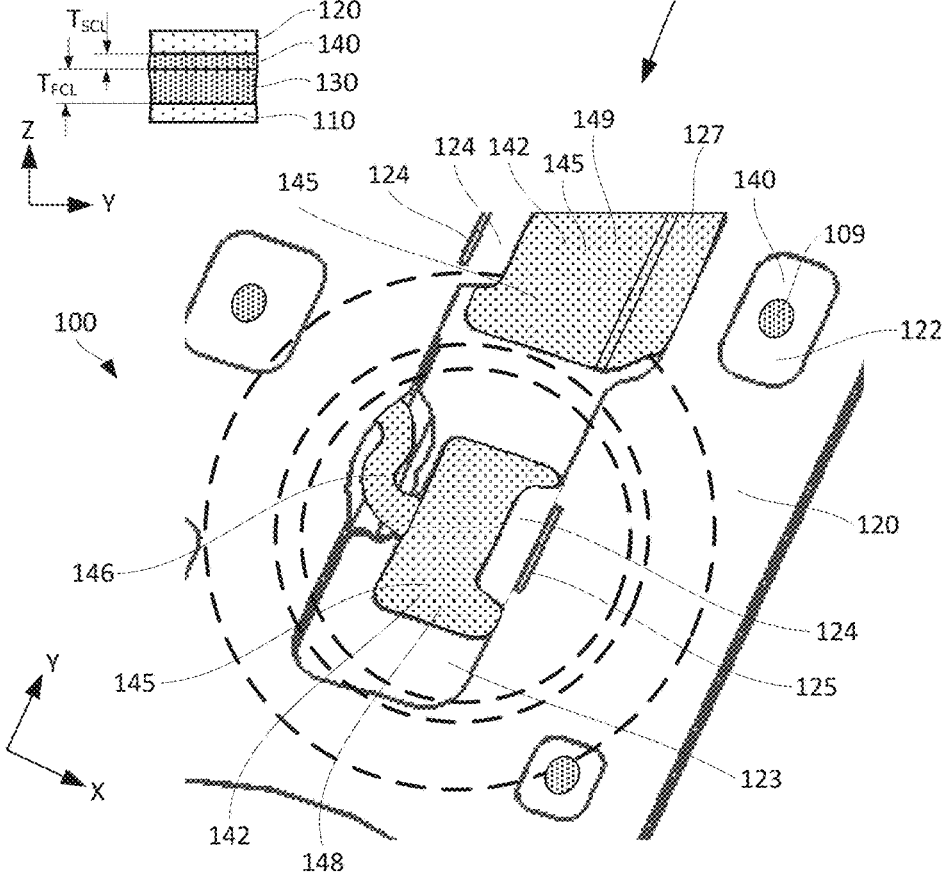
FIG. 2B is a schematic perspective view of a portion of the multilayered flexible battery interconnect in FIG. 2A, which focuses on a flexible tab for connecting to the cell's center contact.

Referring to the perspective view in FIG. 2A, second conductive layer 140 comprises flexible tabs 142. Flexible tabs 142 are used for making electric connections to battery cells 192 as, e.g., is schematically shown in FIG. 2B. For example, FIG. 2B illustrates two flexible tabs 142. The top tab is configured to connect to the edge contact of battery cell 192 (schematically shown with dashed lines) and may be referred to as edge-contact flexible tab 149. The bottom tab is configured to connect to the center contact of the battery cell 192 and may be referred to as center-contact flexible tab 148. It should be noted that these two flexible tabs 142 (center-contact flexible tab 148 and edge-contact flexible tab 149) are parts of different buses (and different portions of second conductive layer 140).

First conductive layer 130 is electrically connected to second conductive layer 140, e.g., by directly interfacing and/by welding. More specifically, first conductive layer 130 and second conductive layer 140 form a stack (as shown in the cross-sectional view in FIG. 2A), which may be referred to as a conductive stack. Second conductive layer 140 or, more specifically, flexible tabs 142 of second conductive layer 140 are responsible for connecting to battery cell 192 and conducting current between battery cell 192 and the conductive stack. However, within the conductive stack, the electric current is predominantly transferred by first conductive layer 130, which is thicker. In fact, the current-carrying capabilities are determined by the relative cross-section of first conductive layer 130 and second conductive layer 140, and these cross-sections are proportional to the layer thicknesses.

In some examples, first conductive layer 130 is at least twice thicker than second conductive layer 140 or, more specifically, at least three times thicker. In the same or other examples, first conductive layer 130 has a thickness of at least 300 micrometers or even at least 350 micrometers, while second conductive layer 140 has a thickness of less than 200 micrometers or even less than 150 micrometers. For example, first conductive layer 130 has a thickness of 400 micrometers, while second conductive layer 140 has a thickness of 125 micrometers. As noted above, a large thickness of first conductive layer 130 allows for conducting significant electric currents through multilayered flexible battery interconnect 100, such as at least 50 A and even greater than 100 A. Furthermore, a large thickness of first conductive layer 130 allows using less conductive materials, such as aluminum (in comparison to copper which is twice more conductive but significantly more expensive and has a much higher specific gravity). At the same time, a smaller thickness of second conductive layer 140 allows welding of flexible tabs 142 to battery cells 192 without using significant energy (and, as a result, without heating battery cells 192).

In some examples, first conductive layer 130 has a uniform thickness throughout the entire boundary of first conductive layer 130. For example, first conductive layer 130 can be formed from the same sheet of metal. Different (disjoint) portions of first conductive layer 130 (forming different buses of the same multilayered flexible battery interconnect 100) can be formed from the same sheet of metal. In the same or other examples, second conductive layer 140 has a uniform thickness throughout the entire boundary of second conductive layer 140.

In some examples, first conductive layer 130 and second conductive layer 140 are formed from the same material, e.g., aluminum. The use of aluminum instead of copper may also help with lowering the minimum achievable fuse current rating due to the higher resistivity and lower melting temperature of aluminum relative to copper. As such, forming fusible links in an aluminum conductive layer may allow for more precise control of the fusible parameters. Alternatively, first conductive layer 130 and second conductive layer 140 are formed from different materials. For example, first conductive layer 130 is formed from aluminum, while second conductive layer 140 is formed from copper. In general, first conductive layer 130 and second conductive layer 140 may be formed from any conductive material that is sufficiently conductive (e.g., a conductivity being greater than $10^6$ S/m or even greater than $10^7$ S/m to allow for current flow through the foil with low power loss).

In some examples, first conductive layer 130 and second conductive layer 140 may include a surface sublayer or coating for providing a low electric contact resistance and/or improving corrosion resistance. The surface sublayer may assist with forming electric interconnections using techniques/materials including, but not limited to, soldering, laser welding, resistance welding, ultrasonic welding, bonding with conductive adhesive, or mechanical pressure. Surface sublayers that may provide a suitable surface for these connection methods include, but are not limited to, tin, lead, zinc, nickel, silver, palladium, platinum, gold, indium, tungsten, molybdenum, chrome, copper, alloys thereof, organic solderability preservative (OSP), or other electrically conductive materials. Furthermore, the surface sublayer may be sputtered, plated, cold-welded, or applied via other means. In some examples, the thickness of the surface sublayer may range from 0.05 micrometers to 10 micrometers or, more specifically, from 0.1 micrometers to 2.5 micrometers. Furthermore, in some examples, the addition of a coating of the OSP on top of the surface sublayer may help prevent the surface sublayer itself from oxidizing over time. The surface sublayer may be used when a base sublayer of first conductive layer 130 and second conductive layer 140 includes aluminum or its alloys. Without protection, exposed surfaces of aluminum tend to form a native oxide, which is insulating. The oxide readily forms in the presence of oxygen or moisture. To provide a long-term stable surface in this case, the surface sublayer may be resistant to the in-diffusion of oxygen and/or moisture. For example, zinc, silver, tin, copper, nickel, chrome, or gold plating may be used as surface layers on an aluminum-containing base layer.

Referring to FIGS. 2A and 2B, in some examples, first conductive layer 130 and second conductive layer 140 are welded together at multiple welded locations 109, separated from each other. For example, welded locations 109 are formed by laser welding, although other forms of welding are also within the scope (e.g., ultrasonic welding, resistance welding). These welded locations 109 help to conduct the current between first conductive layer 130 and second conductive layer 140. Furthermore, these welded locations 109 help to maintain the orientation of first conductive layer 130 and second conductive layer 140 and support these layers with respect to each other. Additional support to first conductive layer 130 and second conductive layer 140 can be provided by first insulating layer 110 and second insulating layer 120, e.g., first insulating layer 110 and second insulating layer 120 extending past the conductive stack and laminated directly to each other thereby forming an envelope-like structure around the conductive stack as shown in FIG. 2E and described below with reference to this figure.

It should be noted that flexible tabs 142 extend past the boundaries of the conductive stack or, more specifically, past the boundary of first conductive layer 130. Flexible tabs 142 also extend past the boundaries of first insulating layer 110 and second insulating layer 120 to form electric connections with battery cells 192. More specifically, various openings are formed in first insulating layer 110 and second insulating layer 120 to access flexible tabs 142. These openings are aligned with contacts of battery cells 192 allowing flexible tabs 142 to protrude into the openings. More specifically, when connected to battery cells 192, flexible tabs 142 protrude into the opening formed within first insulating layer 110 (facing battery cells 192). Openings in second insulating layer 120 are used to access flexible tabs 142 while forming electric connections between flexible tabs 142 and battery cells 192.

In some examples, the openings in first insulating layer 110 and second insulating layer 120 are formed before laminating these insulating layers to respective conductive layers as further described below. The openings may be formed using techniques including, but not limited to, punching, flatbed die cutting, match-metal die cutting, male/female die cutting, rotary die-cutting, laser cutting, laser ablation, waterjet cutting, machining, or etching.

The thickness of one or both first insulating layer 110 and second insulating layer 120 may be between 1 micrometer and 500 micrometers or, more specifically, between 10 micrometers and 125 micrometers. In some examples, each of first insulating layer 110 and second insulating layer 120 includes an adhesive sublayer disposed on at least one surface, facing a corresponding conductive layer, e.g., for lamination to the conductive layer and to each other. These adhesive sublayers may be also used for directly laminating first insulating layer 110 and second insulating layer 120 (beyond the conductive layer boundaries) as described below with reference to FIG. 2E. In some examples, the surface of first insulating layer 110 facing battery cells 192 includes an adhesive sublayer for bonding to these battery cells 192.

First insulating layer 110 and second insulating layer 120 provide the electrical isolation and mechanical support to first conductive layer 130 and second conductive layer 140. In some examples, first insulating layer 110 and second insulating layer 120 may initially be processed in sheet or roll form and may subsequently be laminated to the conductive layer using, for example, adhesive material. First insulating layer 110 and second insulating layer 120 may include (or be formed from) polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), or polyvinyl butyral (PVB).

Referring to FIGS. 2A and 2B, in some examples, second insulating layer 120 comprises welding openings 122. Each of multiple welded locations 109 is positioned within one of welding openings 122. These welding openings 122 allow welding after first conductive layer 130 and second conductive layer 140 have been laminated between first insulating layer 110 and second insulating layer 120.

Figure 2C:
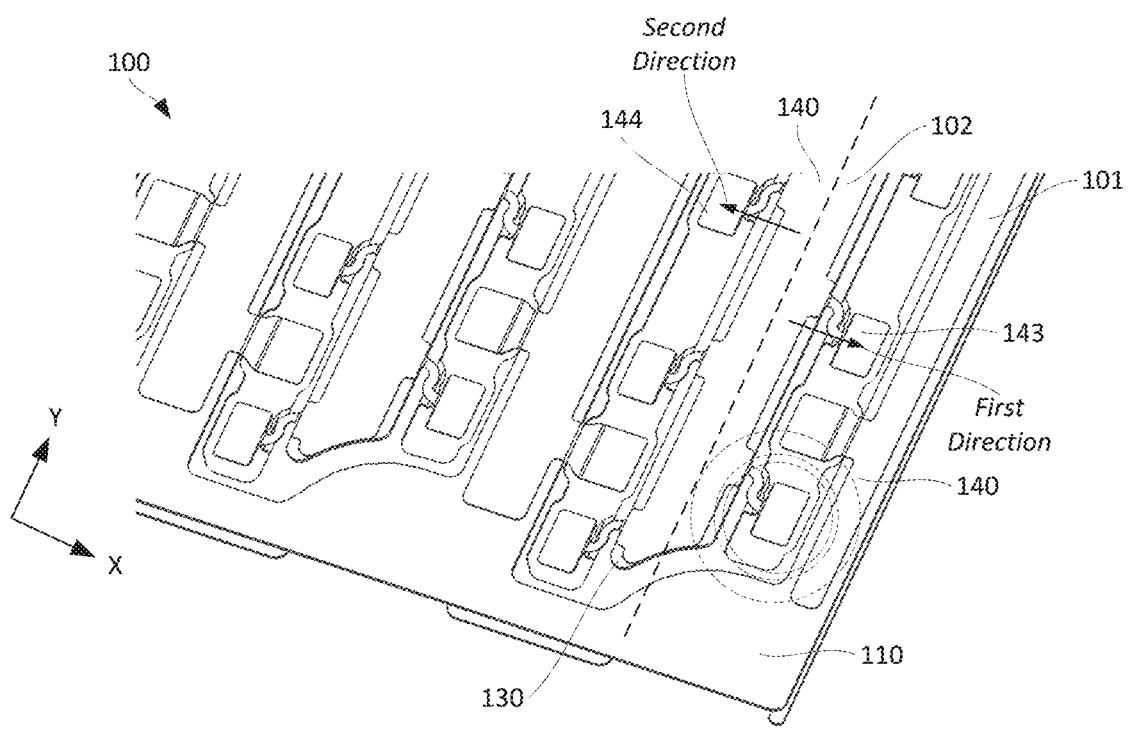
FIG. 2C is a schematic perspective view of the multilayered flexible battery interconnect in FIG. 2A with one insulating layer removed to illustrate different conductive layers of the interconnect.
Figure 2D:
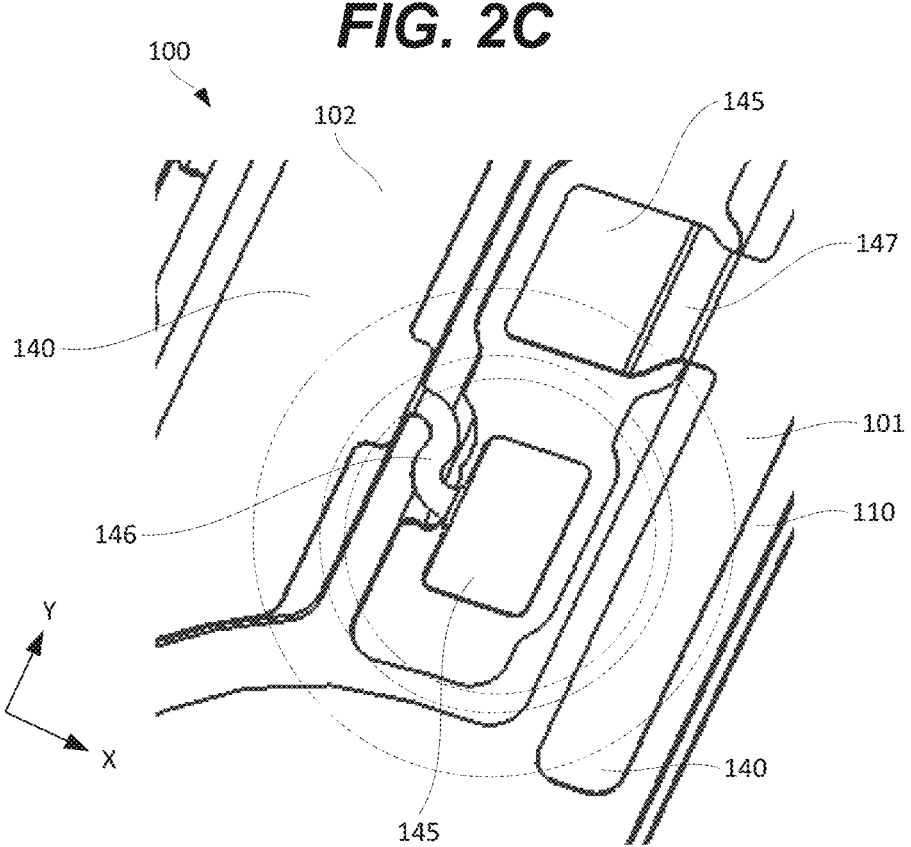
FIG. 2D is a schematic perspective view of a portion of the multilayered flexible battery interconnect in FIG. 2C, which focuses on a flexible tab for connecting to the cell's center contact.
Figure 2E:
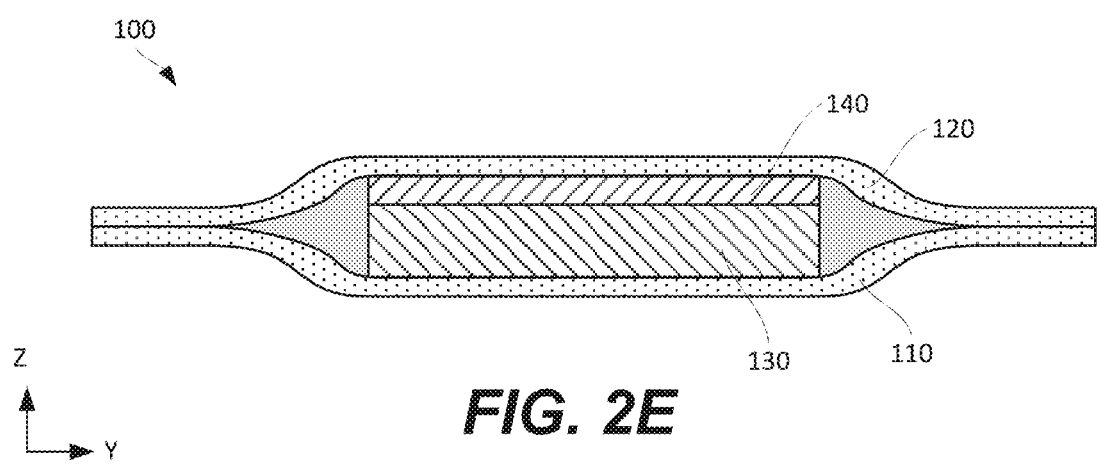
FIG. 2E is a schematic cross-sectional view of a portion of the multilayered flexible battery showing one bus bar, formed by two conductive layers and sealed between two insulating layers.
Figure 3:
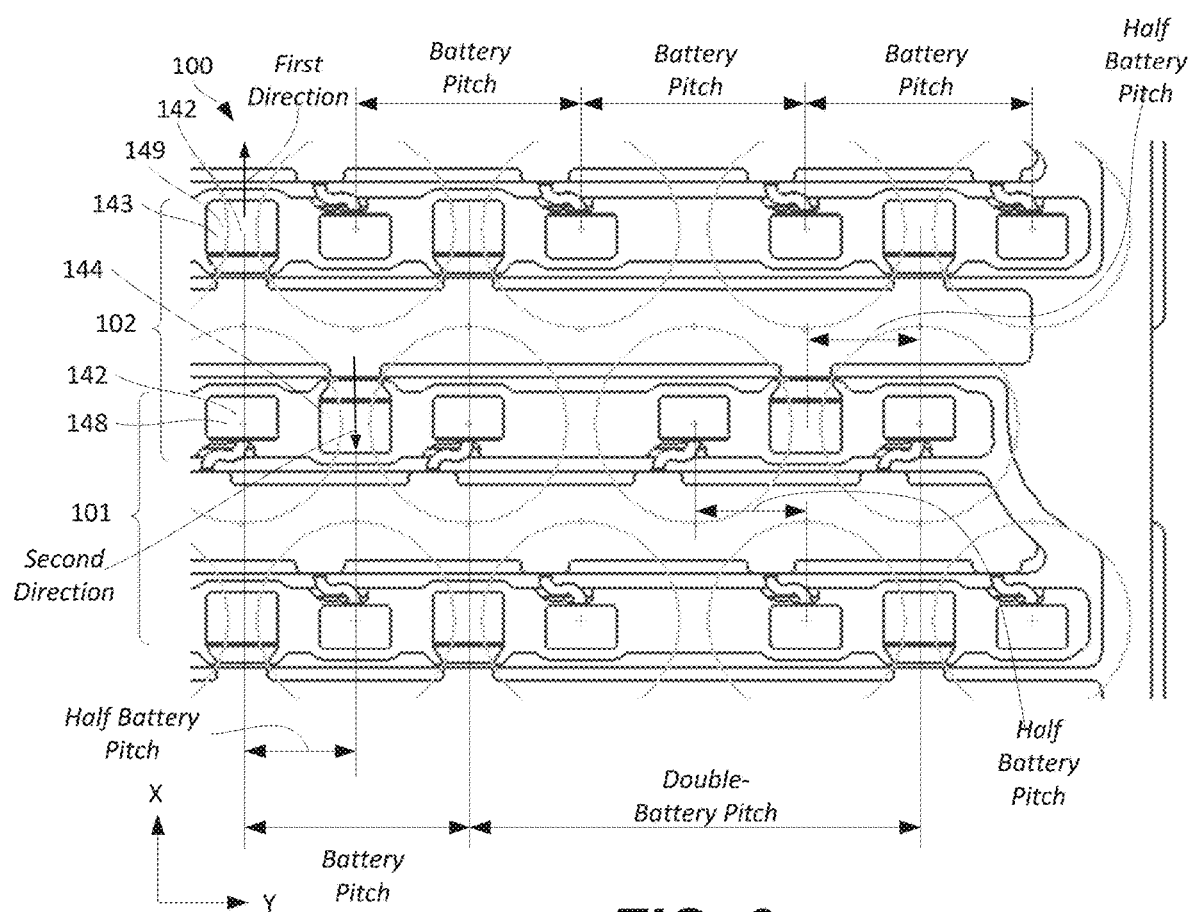
FIG. 3 is a schematic top view of a multilayered flexible battery interconnect, identifying the distances between different types of flexible tabs, in accordance with some examples.

Referring to FIGS. 2C, 2D, and 3, in some examples, flexible tabs 142 comprises first tab set 143 extending in a first direction (along the X-axis) as well as second tab set 144 extending in a second direction, opposite to the first direction. First tab set 143 is used to form electric connections to battery cells 192 positioned in one row, while second tab set 144 is used to form electric connections to battery cells 192 positioned in an adjacent row. It should be noted that while first tab set 143 and second tab set 144 can be formed by any type of flex tabs 142. For example, FIGS. 2C and 2D identify first tab set 143 and second tab set 144 for center-contact flex tabs 148, while FIG. 3 identifies first tab set 143 and second tab set 144 for edge-contact flexible tabs 149. First tab set 143 and second tab set 144 are used to simply differentiate the location of tabs on the same bus.

FIG. 3 illustrates different types of tabs and relative positions of these tabs within multilayered flexible battery interconnect 100. It should be noted that this tab arrangement corresponds to the schematic example presented in FIG. 1C and described above. Specifically, multilayered flexible battery interconnect 100 comprises first bus 101 and second bus 102. Each of first bus 101 and second bus 102 comprises (or is formed by) first conductive layer 130 and second conductive layer 140, comprising flexible tabs 142. It should be noted that conductive components of first bus 101 and second bus 102 are not directly connected to each other. However, these conductive components can be interconnected through battery cells 192. First bus 101 and second bus 102 share first insulating layer 110 and second insulating layer 120, which can be used for mechanical support of first bus 101 and second bus 102 relative to each other.

Referring to FIG. 3, first bus 101 and second bus 102 have different types of flexible tabs 142. Specifically, flexible tabs 142 of second conductive layer 140 forming first bus 101 are configured to connect to first/center contacts 194 of battery cells 192 and are referred to as center-contact flexible tabs 148. On the other hand, flexible tabs 142 of second conductive layer 140 forming second bus 102 are configured to connect to second/edge contacts 195 of battery cells 192 and are referred to as edge-contact flexible tabs 149. In some examples, each edge-contact flexible tab 149 is configured to connect to edge contacts 195 of two adjacent battery cells 192.

As shown in FIG. 3, one edge-contact flexible tab 149 and one center-contact flexible tab 148 are connected to each battery cell 192. In some examples, described above with reference to FIGS. 1D, two edge-contact flexible tabs 149 and one center-contact flexible tab 148 are connected to each battery cell 192. In either case, both edge-contact flexible tabs 149 and center-contact flexible tabs 148 extend over the same row of battery cells 192, forming an interdigitated assembly. It should be noted that both edge-contact flexible tabs 149 and center-contact flexible tabs 148 have first tab set 143 and second tab set 144, extending in different directions.

Various spacing between flexible tabs 142 (in the same or different sets and/or in the same or different buses) is shown in FIG. 3. In some examples, first tab set 143 is offset relative to second tab set 144 by a half of a battery pitch of battery pack 190. This offset applied to center-contact flexible tabs 148 and edge-contact flexible tabs 149.

Referring to center-contact flexible tabs 148 in the example of FIG. 3, in some examples, any two adjacent tabs in first tab set 143 are spaced apart by a battery pitch of battery pack 190. Also, any two adjacent tabs in second tab set 144 are spaced apart by the battery pitch of battery pack 190.

Referring to edge-contact flexible tabs 149 in the example of FIG. 3, in some examples, any two adjacent edge-contact flexible tabs 149 are spaced apart by a battery pitch or a double of battery pitch of battery pack 190. More specifically, any two adjacent tabs in first tab set 143 are spaced apart by a battery pitch or a double of the battery pitch of battery pack 190. Likewise, any two adjacent tabs in second tab set 144 are spaced apart by a battery pitch or a double of battery pitch of battery pack 190.

FIG. 2B illustrates center-contact flexible tab 148, which comprises contact pad 145 and fusible link 146, connecting and supporting contact pad 145 relative to a remaining part of second conductive layer 140. Contact pad 145 is configured to connect to center contact 195 of one of batteries 192. Furthermore, second insulating layer 120 comprises contact opening 123 such that fusible link 146 and at least the majority of contact pad 145 protrude into contact opening 123. As such, fusible link 146 is not impacted by the thermal mass of second insulating layer 120 (although fusible link 146 can be supported, at least in part, by first insulating layer 110). Furthermore, contact opening 123 provides access to contact pad 145 when welding contact pad 145 to first/center contact 194 of battery cell 192.

Figure 5A:
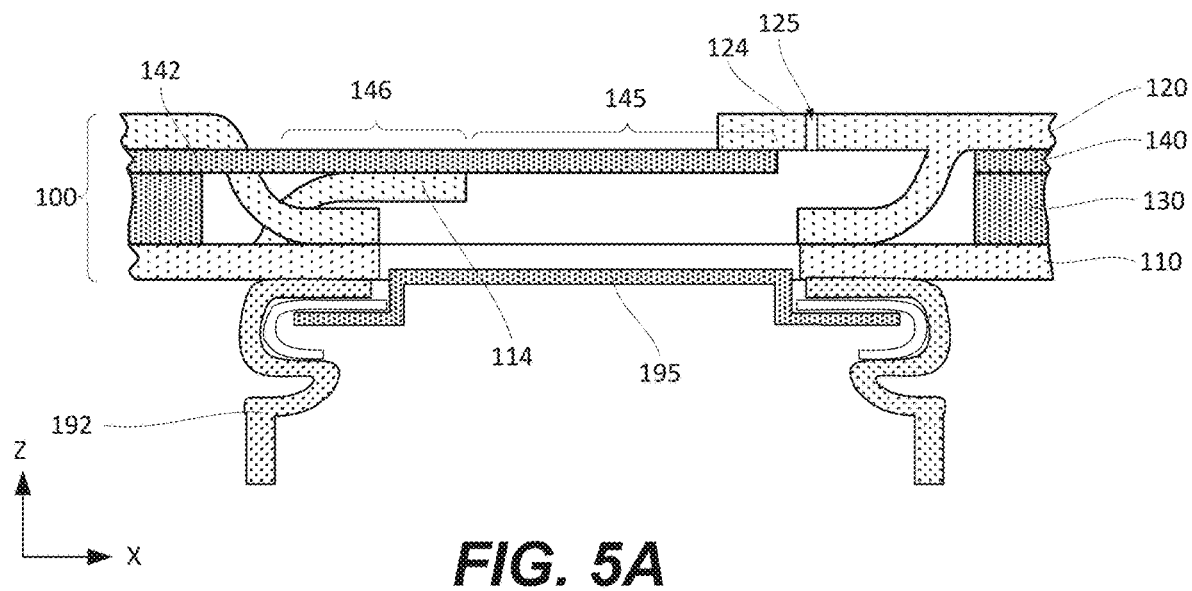
FIG. 5A is a schematic side cross-sectional view of a battery cell and a multilayered flexible battery interconnect, before forming an electric connection to the cell, in accordance with some examples.
Figure 5B:
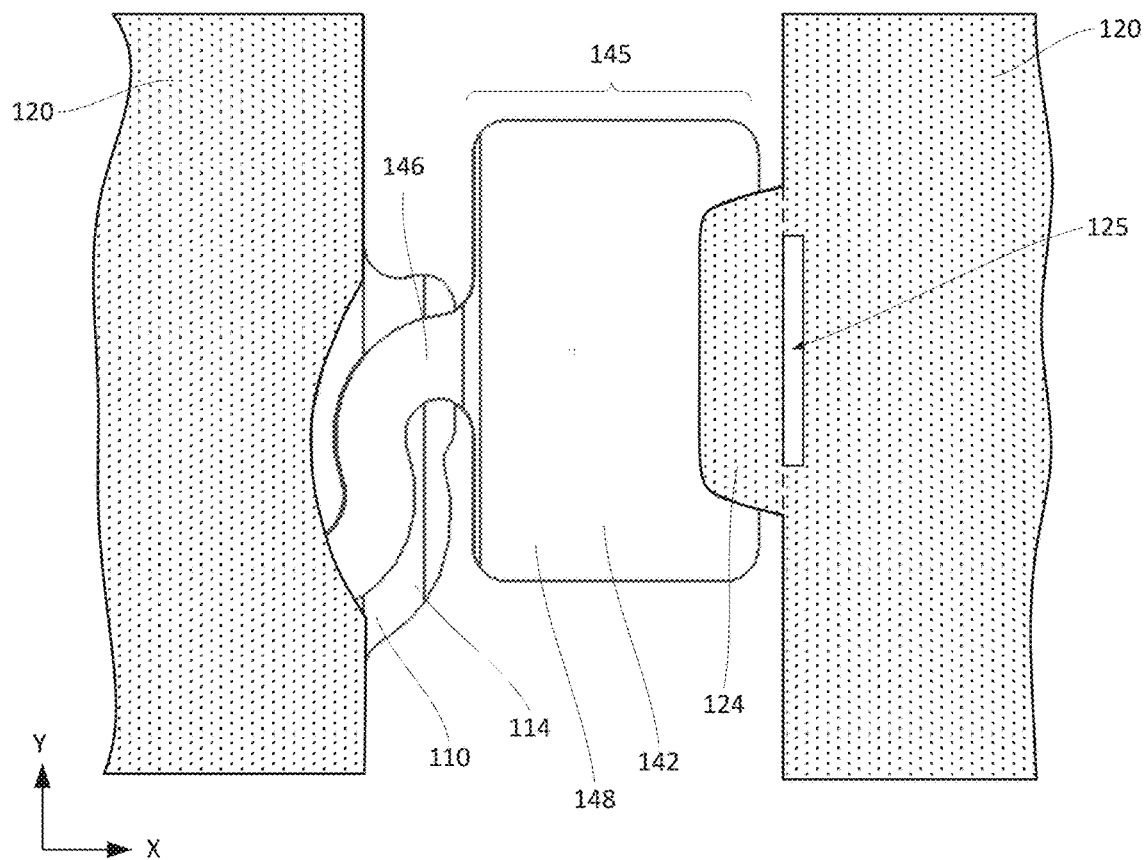
FIG. 5B is a schematic top view of the multilayered flexible battery interconnect in FIG. 5A, showing an example of a center-contact flexible tab.
Figure 5C:
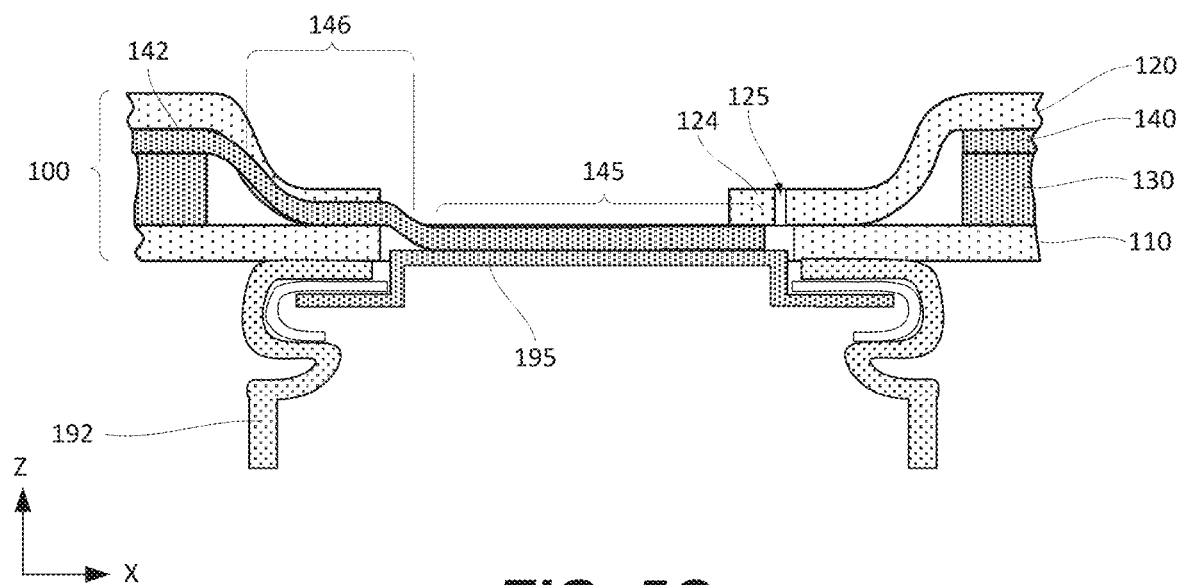
FIGS. 5C and 5D are schematic side cross-sectional views of a battery cell and a multilayered flexible battery interconnect after forming an electric connection to the cell is formed, in accordance with some examples.
Figure 5D:
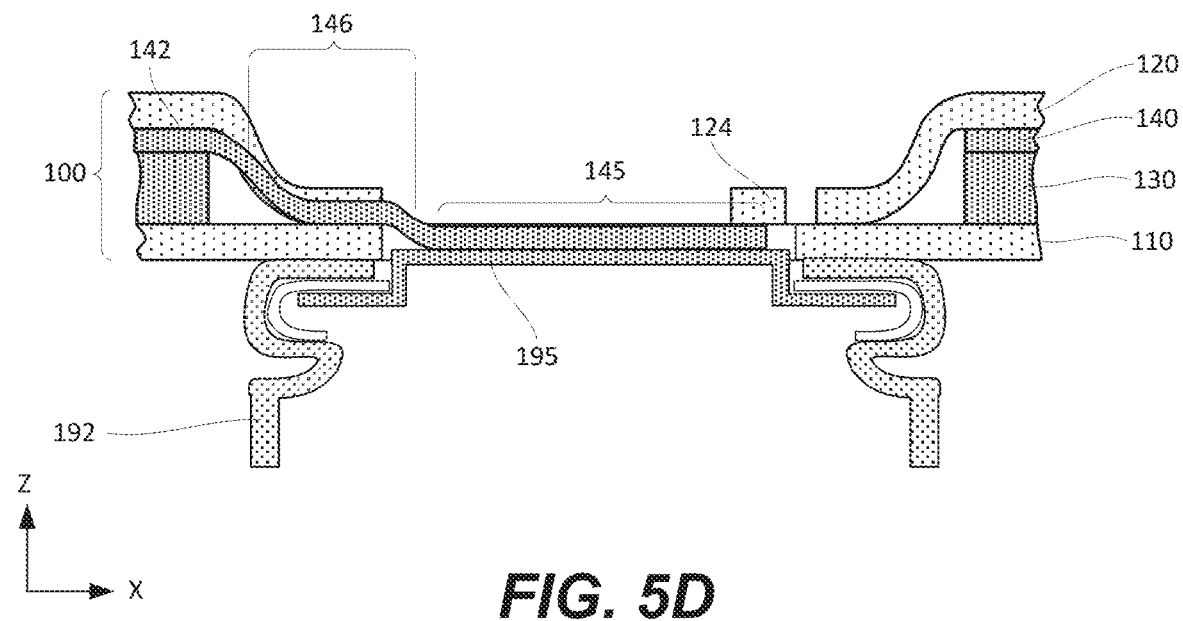
Figure 5E:
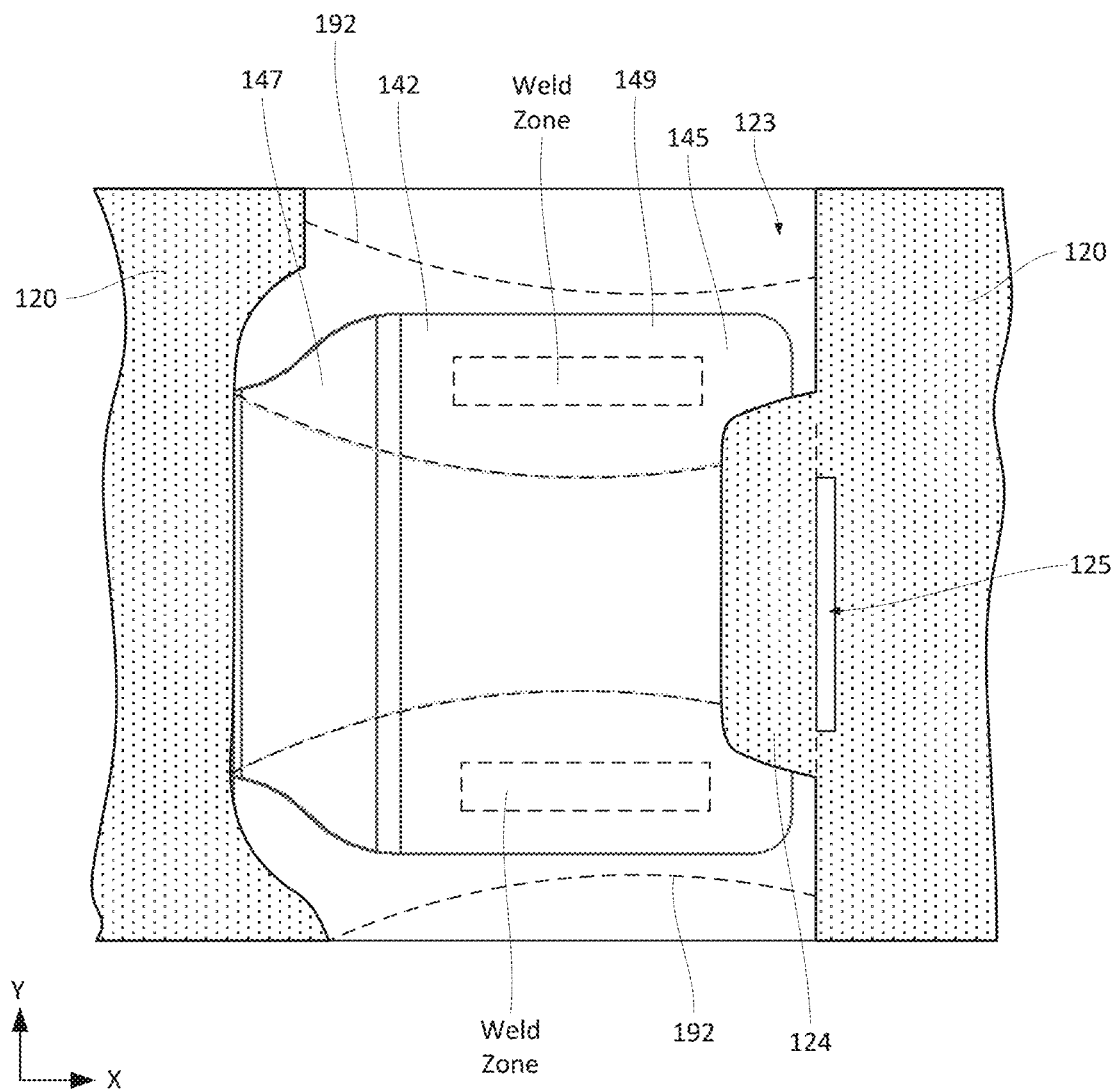
FIG. 5E is a schematic top view of a multilayered flexible battery interconnect showing an example of an edge-contact flexible tab.

Referring to FIG. 2B as well as FIGS. 5A, 5B, and 5E, in some examples, second insulating layer 120 comprises support tab 124, at least partially defining contact opening 123. A portion of contact pad 145 is adhered to support tab 124. Support tab 124 supports contact pad 145, at least before forming an electric connection to battery cell 192. In some examples, contact pad 145 is separated from support tab 124 while forming this electric connection. Alternatively, contact pad 145 remains adhered to support tab 124 even after the electric connection is formed, e.g., as schematically shown in FIG. 5C. In yet another example, support tab 124 is separated from the remaining portion of second insulating layer 120 while forming this electric connection, e.g., as schematically shown in FIG. 5D.

Referring to FIG. 2B as well as FIGS. 5A, 5B, and 5E, in some examples, second insulating layer 120 comprises flexibility slit 125, extending along the interface between support tab 124 and the remaining portion of second insulating layer 120. Flexibility slit 125 helps with the out-of-plane bend (the X-Y plane) of support tab 124, e.g., when contact pad 145 is toward a battery cell and forms an electric connection to this cell.

Referring to FIGS. 5A and 5B, in some examples, at least a portion of fusible link 146 adheres to first insulating layer 110. For example, first insulating layer 110 comprises link-supporting tab 114 extending beyond the edge formed by first insulating layer 110 and second insulating layer 120. It should be noted that while one surface of fusible link 146 adheres to first insulating layer 110, the other surface of fusible link 146 is exposed thereby reducing the impact of insulating layers on the performance of fusible link 146.

Referring to FIGS. 2B and 5E, in some examples, edge-contact flexible tab 149 comprises contact pad 145 and flexible neck 147. Flexible neck 147 connects and supports contact pad 145 relative to the remaining part of edge-contact flexible tab 149. Unlike fusible link 146, flexible neck 147 is much wider and does not provide current controlling functions. However, flexible neck 147 is capable of supporting current from two battery cells 192, when contact pad 145 of this edge-contact flexible tab 149 is connected to their respective edge contact 195. Overall, in some examples, contact pad 145 is configured to simultaneously connect to edge contacts 195 of two adjacent ones of batteries 192. These connections are schematically shown as weld zones in FIG. 5E.

Referring to FIG. 5E, in some examples, in some examples, second insulating layer 120 comprises contact opening 123. Flexible neck 147 and the majority of contact pad 145 protrude into contact opening 123. Contact opening 123 allows the out-of-plane bend (the X-Y plane) of contact pad 145 when edge-contact flexible tab 149 forms connections with battery cells 192. Furthermore, contact opening 123 allows accessing contact pad 145 while forming these connections.

Referring to FIG. 2E, in some examples, first insulating layer 110 and second insulating layer 120 directly adhere to each other forming a boundary around portions of first conductive layer 130 and second conductive layer 140. This feature helps to maintain the orientation of first conductive layer 130 and second conductive layer 140 before these layers are welded together. Furthermore, this features seals these conductive layer portions from the environment, e.g., preventing electrical shorts and/or corrosion.

Figure 4A:
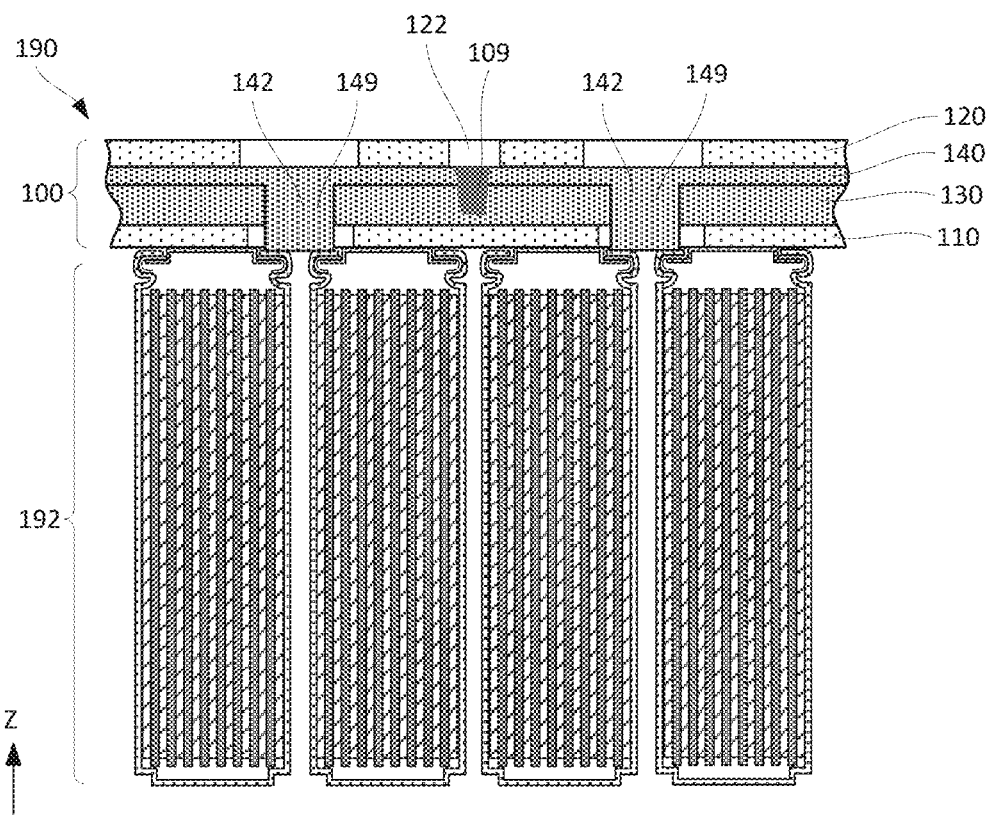
FIGS. 4A-4D are schematic side cross-sectional views of a battery pack, illustrating four battery cells interconnected by a multilayered flexible battery interconnect, in accordance with some examples.
Figure 4B:
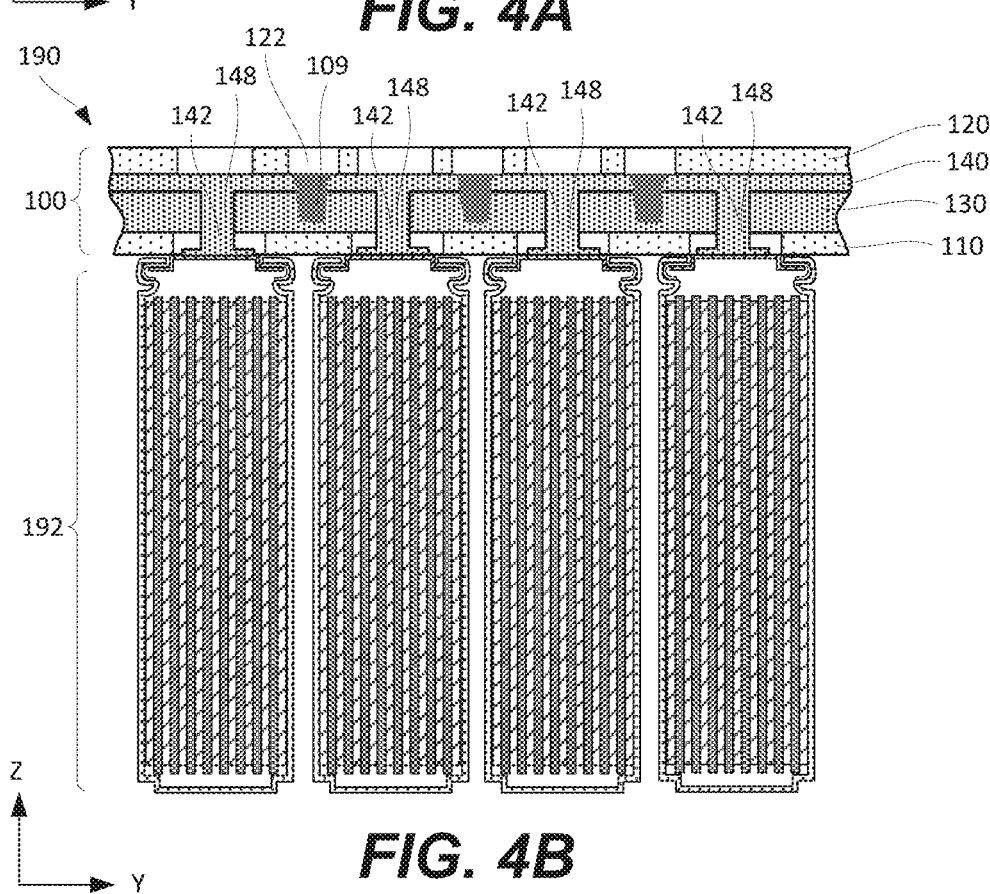

In some examples, a thicker conductive layer is positioned between battery cells and a thinner conductive layer thereby providing access to the thinner conductive layer (i.e., from the side opposite of the battery cells). Referring to FIGS. 4A and 4B, first conductive layer 130 is thicker than second conductive layer 140. Second conductive layer 140 can be accessed through welding openings 122 in second insulating layer 120, e.g., to weld second conductive layer 140 to first conductive layer 130 and form weld locations 109. In some examples, this welding is performed at the same time when flexible tabs 142 are welded to battery cells 192. Specifically, FIG. 4A illustrates edge-contact flexible tabs 149, each connected to two adjacent battery cells 192. FIG. 4B illustrates center-contact flexible tabs 148, each connected to one or battery cells 192.

Figure 4C:
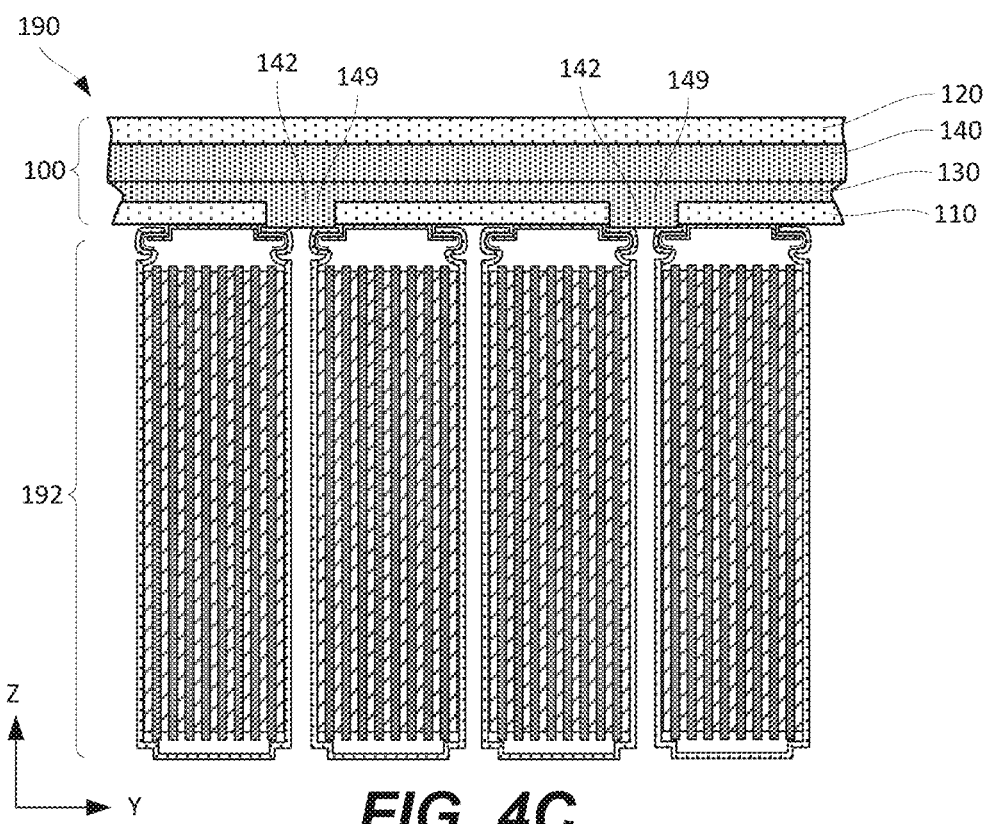
Figure 4D:
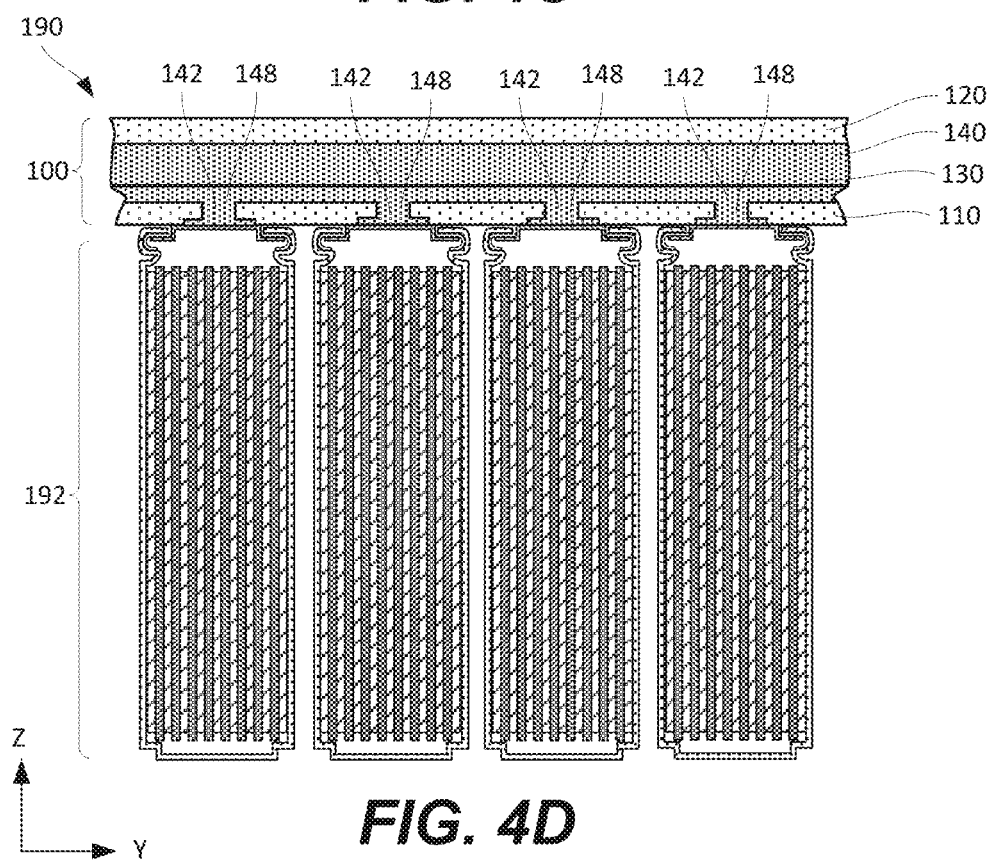

In some examples, a thinner conductive layer is positioned between battery cells and a thicker conductive layer thereby positioning flexible tabs (which are parts of the thinner conductive layer) closer to the battery cells. In other words, the flexible tabs need to have smaller out-of-plane bends to reach the battery cells. Referring to FIGS. 4C and 4D, first conductive layer 130 is thinner than second conductive layer 140. In this example, flexible tabs 142 are parts of first conductive layer 130. FIG. 4C illustrates edge-contact flexible tabs 149, each connected to two adjacent battery cells 192. FIG. 4D illustrates center-contact flexible tabs 148, each connected to one or battery cells 192.

As described above, flexible tabs 142 are positioned in a plane with the rest of the conductive layer before forming electric connections to battery cells. FIG. 5A is a schematic side cross-sectional view of battery cell 192 and multilayered flexible battery interconnect 100 before forming an electric connection to battery cell 192. In this example, the connection will be formed to center contact 195 of battery cell 192. FIG. 5B is a schematic top view of the multilayered flexible battery interconnect 100 in FIG. 5A. Flexible tab 142, which in this example may be referred to as center-contact flexible tab 148 is supported by support tab 124. More specifically, a portion of contact pad 145 of flexible tab 142 is adhered to support tab 124.

FIGS. 5C and 5D are schematic side cross-sectional views of battery cell 192 and multilayered flexible battery interconnect 100 after the electric connection to battery cell 192 is formed. Specifically, contact pad 145 is bent out-of-plane and protrudes into an opening in first insulating layer 110. Another opening in second insulating layer 120 provides access to contact pad 145 during this operation. Contact pad 145 is in direct contact with center contact 195 of battery cell 192 and is welded to center contact 195 in this position. Support tab 124 may remain attached to contact pad 145. In some examples, shown in FIG. 5D, support tab 124 is separated from the rest of second insulating layer 120.

Voltage Trace Examples

Figure 6A:
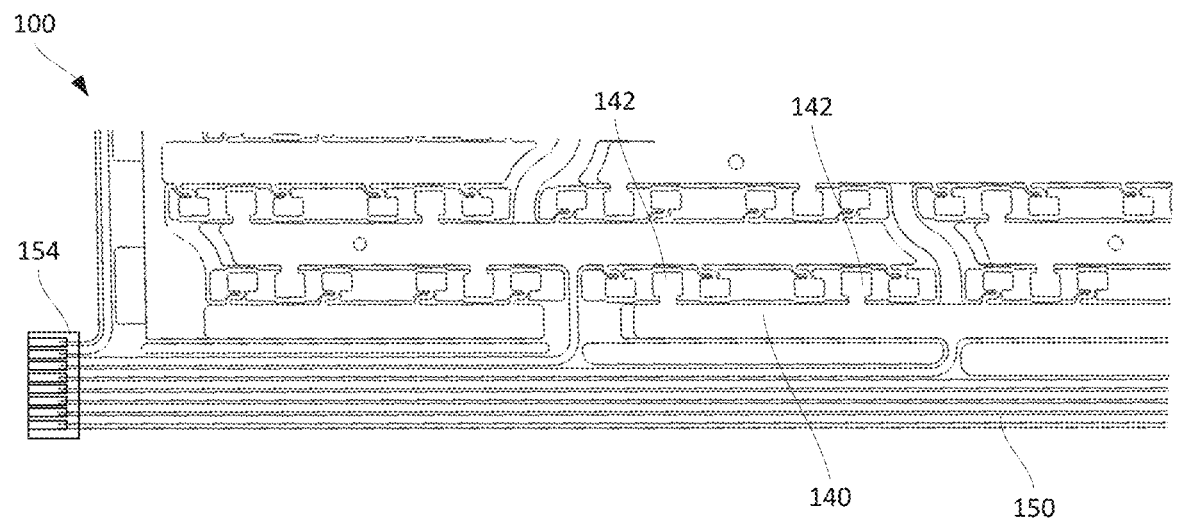
FIGS. 6A-6D are schematic top views of voltage traces of a multilayered flexible battery interconnect, in accordance with some examples.

FIGS. 6A-6D are schematic top views of voltage traces 150 of multilayered flexible battery interconnect 100, in accordance with some examples. For example, voltage traces 150 may be used to monitor the voltage at each bus bar of multilayered flexible battery interconnect 100. In other words, each voltage trace 150 is connected to a different bus bar and is used to monitor the voltage at this bus bar. Specifically, FIG. 6A illustrates voltage traces 150 are being parts of second conductive layer 140. More specifically, each voltage trace 150 is monolithic with a corresponding portion of second conductive layer 140, forming the same bus bar.

Figure 6B:
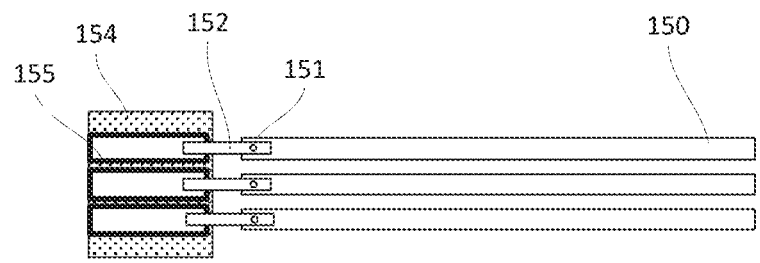
Figure 6C:
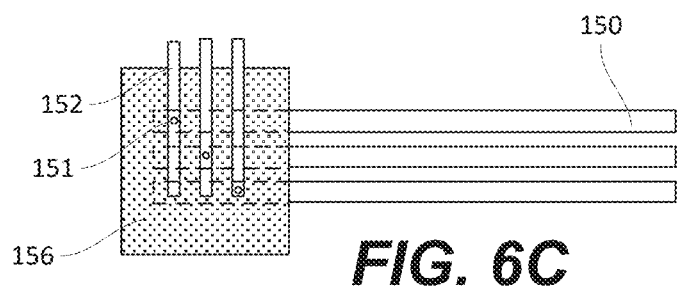
Figure 6D:
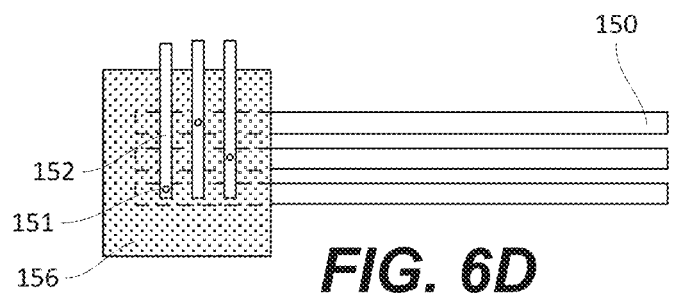

In some examples, voltage traces 150 (or other components of second conductive layer 140) are formed from a material that may not suitable for some applications, e.g., forming connections to connector terminals). For example, voltage traces 150 are formed from aluminum, which is not easily solderable. In these examples, multilayered flexible battery interconnect 100 comprise transition traces 152 as, e.g., is shown in FIGS. 6B-6D. Transition traces 152 can be formed from a different material (e.g., copper) than voltage traces 150 (e.g., aluminum). Each voltage trace 150 can have a corresponding transition trace 152. However, the number of voltage traces 150 and transition trace 152 can differ in some examples (e.g., unused traces, multiple transition traces 152 connected to one voltage trace 150, etc.). Transition trace 152 may overlap with voltage trace 150 and may be welded to voltage trace 150 (e.g., in a manner second conductive layer 140 is welded to first conductive layer 130. Connections 151 are schematically shown with a circle in FIGS. 6B-6D. Transition traces 152 may be then connected to terminal 155 of connector 154.

Referring to FIGS. 6C and 6D, in some examples, multiple options for interconnecting transition traces 152 and voltage traces 150 are available. For example, insulating layer 156 is positioned between transition traces 152 and voltage traces 150. In some examples, insulating layer 156 can be one of first insulating layer 110 or second insulating layer 120. Furthermore, transition traces 152 and voltage traces 150 may overlap forming a many-to-many grid as, e.g., is schematically shown in FIGS. 6C and 6D. In other words, each transition trace 152 overlaps multiple voltage traces 150. Also, each voltage trace 150 overlaps multiple transition traces 152. For example, FIGS. 6C and 6D illustrate transition traces 152 and voltage traces 150 extending at a right angle relative to each other such that each transition traces 152 overlap all voltage traces 150.

This insulation, overlap, and orientation of transition traces 152 and voltage traces 150 allows different connection options. Specifically, in FIG. 6C, left transition trace 152 is connected to top voltage trace 150, middle transition trace 152 is connected to middle voltage trace 150, and right transition trace 152 is connected to bottom voltage trace 150. In FIG. 6D, left transition trace 152 is connected to bottom voltage trace 150, middle transition trace 152 is connected to top voltage trace 150, and right transition trace 152 is connected to middle voltage trace 150. It should be noted that one transition trace 152 can be connected to multiple voltage traces 150. Similarly, multiple transition traces 152 can be connected to the same voltage trace 150. One having ordinary skill in the art would recognize various overlap and connection options.

Figure 6E:
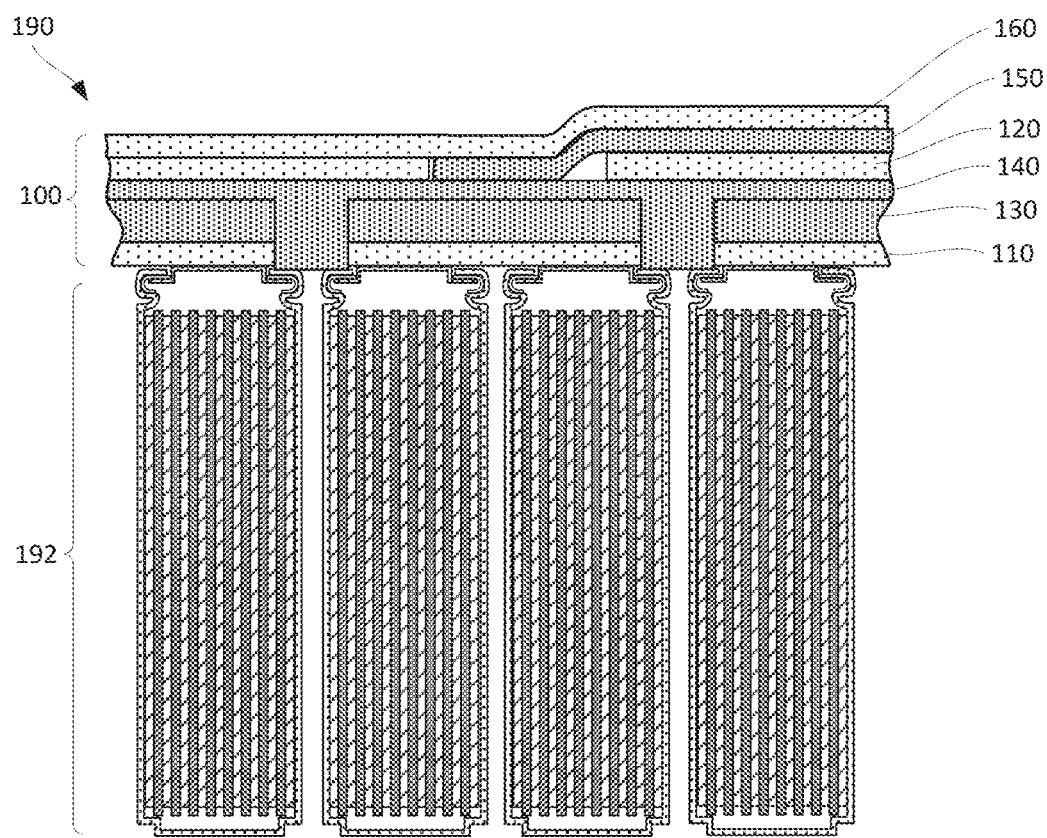
FIG. 6E is a schematic side cross-sectional view of battery cells and a multilayered flexible battery interconnect comprising a voltage trace, in accordance with some examples.

FIG. 6E is a schematic side cross-sectional view of battery cells 192 and multilayered flexible battery interconnect 100 comprising voltage trace 150, in accordance with some examples. Here, voltage trace 150 is positioned as a separate layer (separate from other conductive layers) in multilayered flexible battery interconnect 100, e.g., stacked with other components. For example, second insulating layer 120 is positioned between at least a portion of voltage trace 150 and second conductive layer 140. Second insulating layer 120 comprises an opening, through which voltage trace 150 is able to make a connection with one of the bus bars formed by the conduct layers. FIG. 6E also illustrates third insulating layer 160, which isolates voltage trace 150 from the environment and also supports voltage trace 150 relative to second insulating layer 120.

Figure 6F:
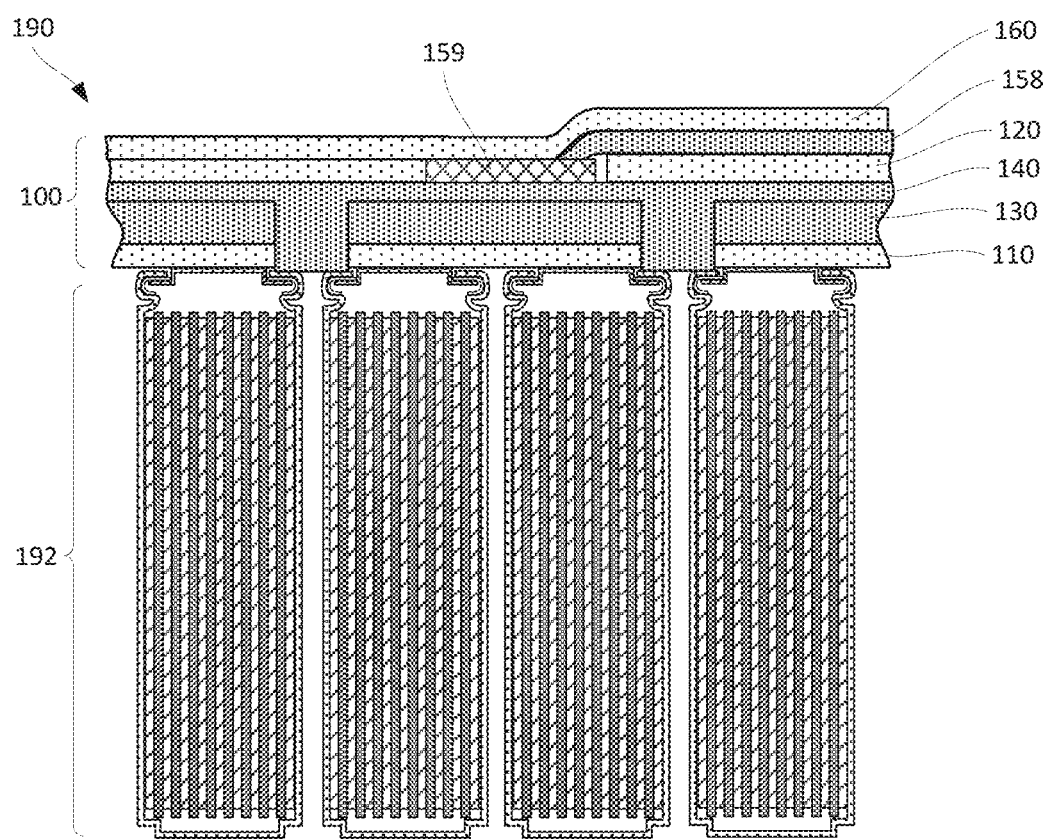
FIG. 6F is a schematic side cross-sectional view of battery cells and a multilayered flexible battery interconnect comprising a signal trace and a sensor, connected to the signal trace, in accordance with some examples.

FIG. 6F is a schematic side cross-sectional view of battery cells 192 and multilayered flexible battery interconnect 100 comprising signal trace 158 and sensor 159, connected to signal trace 158, in accordance with some examples. Various examples of sensor 159 are within the scope, such as a thermocouple, a moisture sensor, a pressure sensor, and the like. In some examples, sensor 159 directly interfaces one of the conductive layers, e.g., second conductive layer 140 as shown in FIG. 6F.

Example of Interconnecting Prismatic Cells

While the above examples of multilayered flexible battery interconnect 100 are described in the context of cylindrical battery cells, many of the described features are also applicable to prismatic battery cells. FIG. 7A is a schematic top view of four prismatic battery cells 192, illustrating a desired in-series connection of these cells. Specifically, each battery cell 192 comprises first contact 194 and second contact 195. While FIG. 7A illustrates an alternating flipped position of prismatic battery cells 192 and an in-series connection of these cells, various other orientations and connections are within the scope.

Figure 7B:
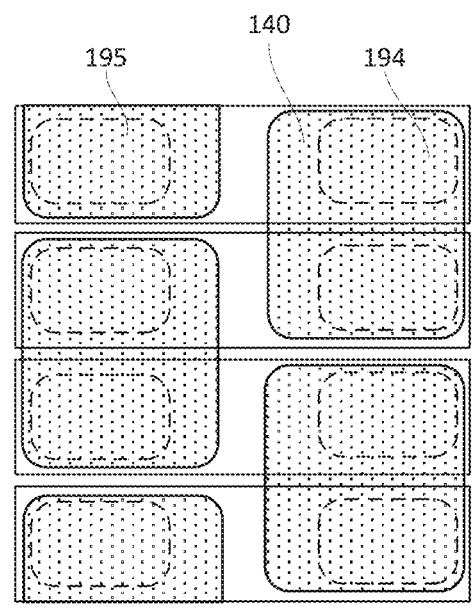
FIG. 7B is a schematic top view of the four prismatic cells in FIG. 7A, illustrating the first conductive layer of a multilayered flexible battery interconnect positioned over and interconnecting the cells.

FIG. 7B is a schematic top view of four prismatic cells 192 in FIG. 7A, illustrating second conductive layer 140 of multilayered flexible battery interconnect 100 positioned over and interconnecting cells 192. Second conductive layer 140 is shown separately to illustrate various features of this layer. One having ordinary skill in the art would recognize that second conductive layer 140 is a part of multilayered flexible battery interconnect 100, comprising other components such as first conductive layer 130, first insulating layer 110, and second insulating layer 120. Second insulating layer 120 is not shown. One having ordinary skill in the art would also recognize that second insulating layer 120 is positioned between prismatic battery cells 192 and second conductive layer 140 and comprises openings aligned with first contacts 194 and second contacts 195 of each cell.

Figure 7C:
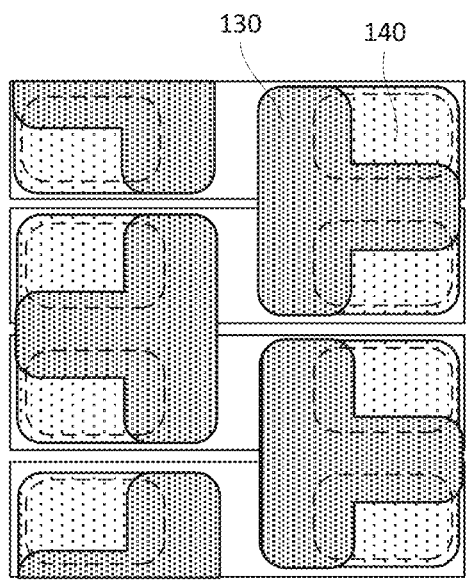
FIG. 7C is a schematic top view of the four prismatic cells in FIG. 7A, illustrating the first and second conductive layers of a multilayered flexible battery interconnect positioned over and interconnecting the cells.

FIG. 7C is a schematic top view of four prismatic cells 192 in FIG. 7A, illustrating first conductive layer 130 and second conductive layer 140 of multilayered flexible battery interconnect 100 positioned over and interconnecting the cells. First conductive layer 130 is thicker than second conductive layer 140. As such, only second conductive layer 140 is welded directly to first contacts 194 and second contacts 195 of the cells. Furthermore, the footprint of first conductive layer 130 is smaller than that of second conductive layer 140. Second conductive layer 140 extends past first conductive layer 130, especially over the battery contacts. This feature allows welding second conductive layer 140 to these battery contacts without interference from first conductive layer 130. Second conductive layer 140, being a thinner layer, requires less energy for welding thereby avoiding excessive temperatures at the battery contacts. At the same time, first conductive layer 130 provides additional conductivity between the battery contacts without making direct connections to these contacts.

Figure 7D:
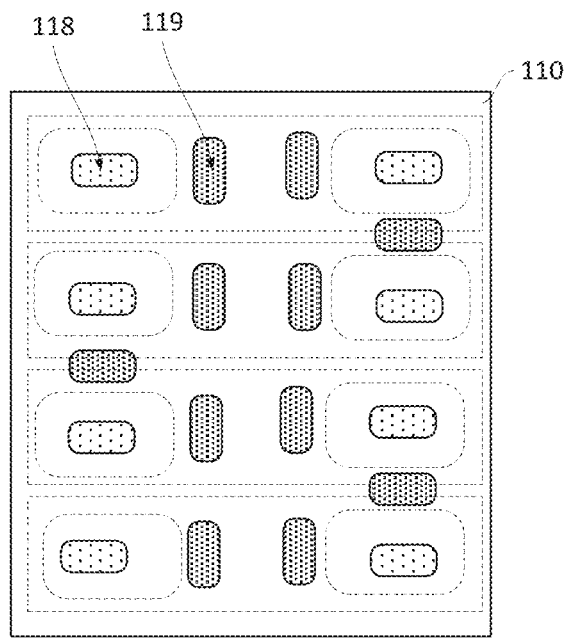

FIG. 7D is a schematic top view of four prismatic cells 192 in FIG. 7A, illustrating the entire multilayered flexible battery interconnect 100 positioned over the cells. Specifically, FIG. 7D illustrates various openings in first insulating layer 110. These openings are used for forming various connections. Internal-weld openings 118 are positioned over both first conductive layer 130 and second conductive layer 140 and are used for welding these two conductive layers together. External-weld openings 119 are positioned over second conductive layer 140 (but not over first conductive layer 130) and are used for welding second conductive layer 140 to the battery contacts.

Examples of Fabricating Multilayered Flexible Battery Interconnects

Figure 8:
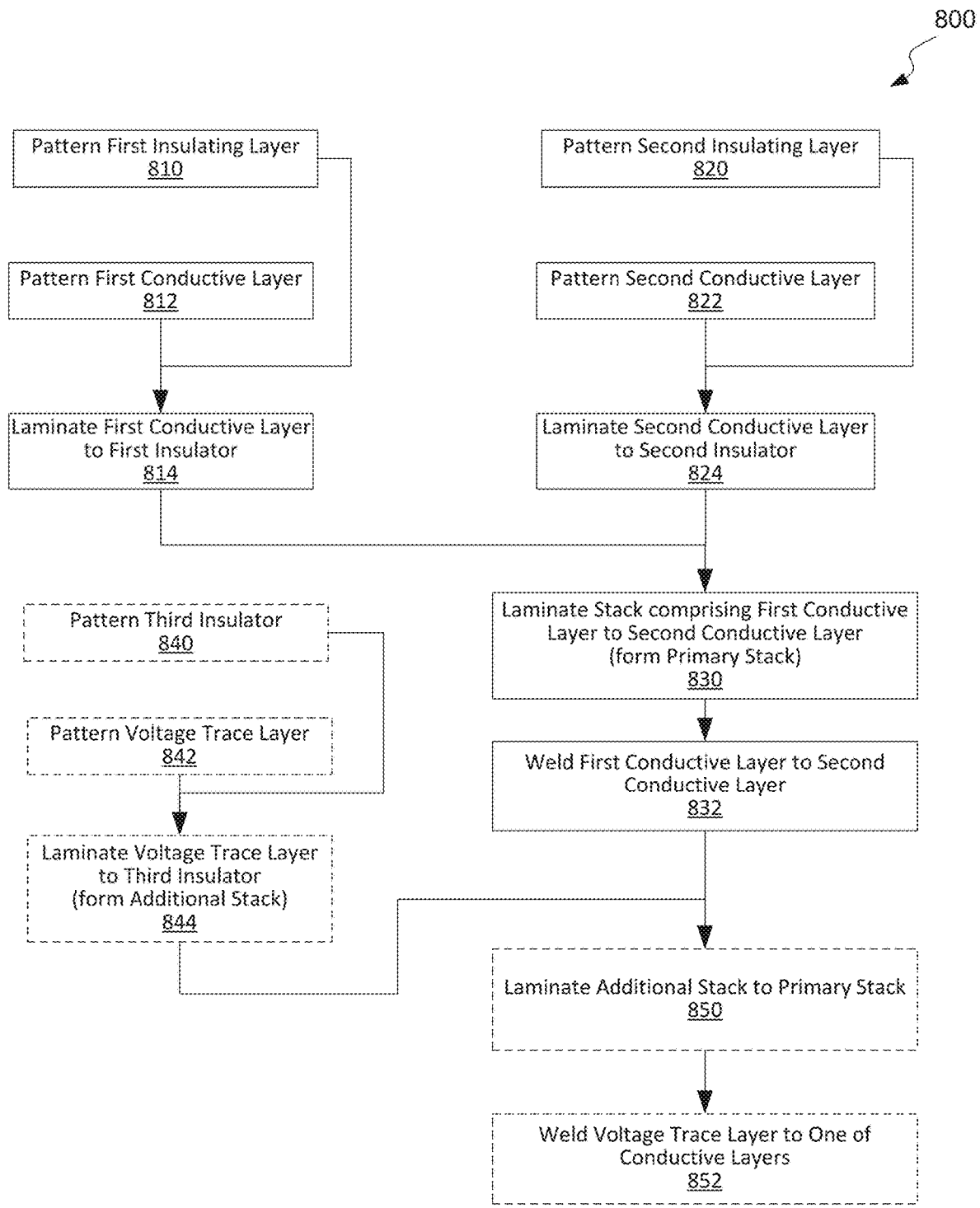
FIG. 8 is a process flowchart corresponding to a method of fabricating a multilayered flexible battery interconnect, in accordance with some examples.

FIG. 8 is a process flowchart corresponding to method 800 of fabricating multilayered flexible battery interconnect 100, in accordance with some examples. Various examples of multilayered flexible battery interconnect 100 are described above.

Figure 10A:
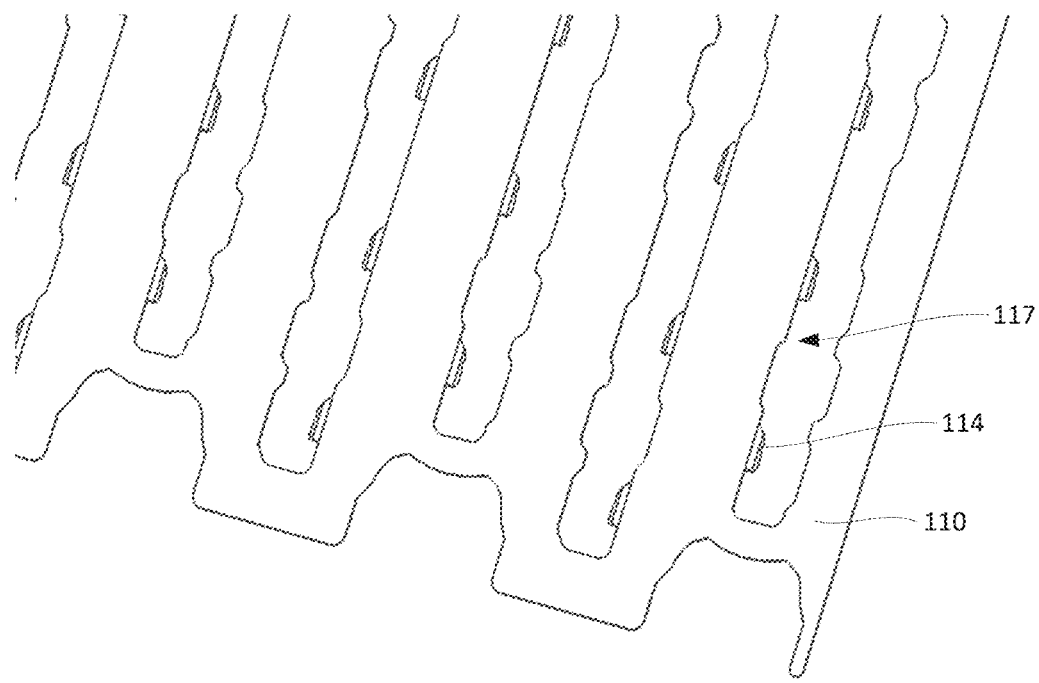
FIGS. 10A-10F are schematic views of different components and assemblies used for fabricating a multilayered flexible battery interconnect.

In some examples, method 800 comprises patterning (block 810) first insulating layer 110. One example of first insulating layer 110 is presented in FIG. 10A. For example, various openings 117 may be formed in a continuous base film, yielding first insulating layer 110. These openings 117 provide access to flexible tabs 142 within multilayered flexible battery interconnect 100.

Figure 10B:
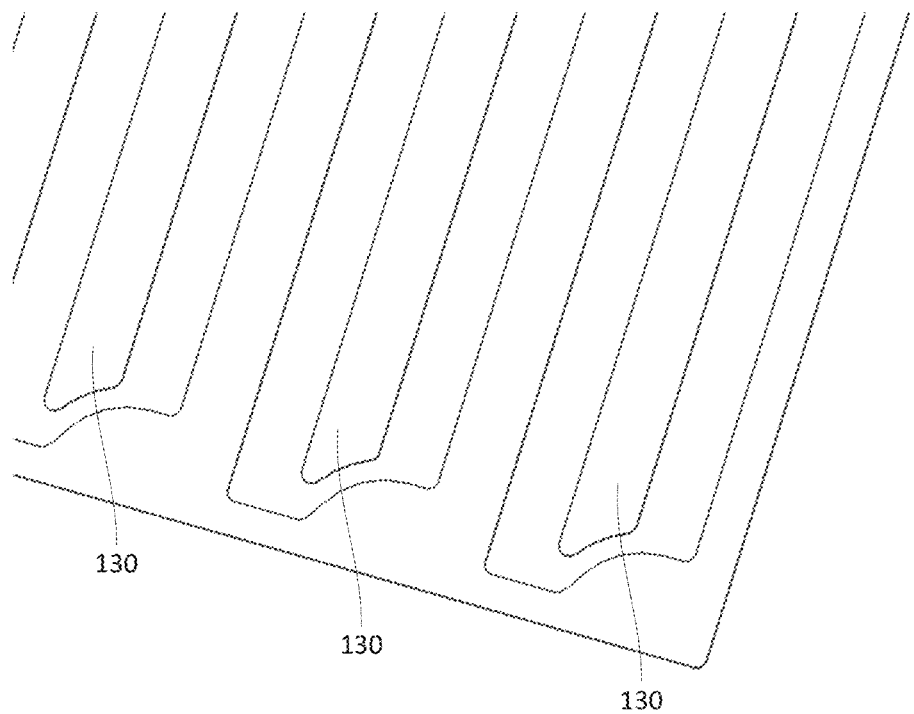

Returning to FIG. 8, in some examples, method 800 comprises patterning (block 812) first conductive layer 130. One example of first conductive layer 130 is presented in FIG. 10B. For example, separate portions of first conductive layer 130 may be formed from a continuous base metal foil, yielding first conductive layer 130. Each of these portions represents a different bus of multilayered flexible battery interconnect 100 (e.g., FIG. 10I3 illustrating three different portions). In some examples, first conductive layer 130 is supported on a temporary substrate (e.g., also used for patterning of first conductive layer 130), at least before first conductive layer 130 is laminated to first insulating layer 110. Once first conductive layer 130 is first insulating layer 110, first insulating layer 110 provides support to disjoined portions of first conductive layer 130.

Figure 10C:
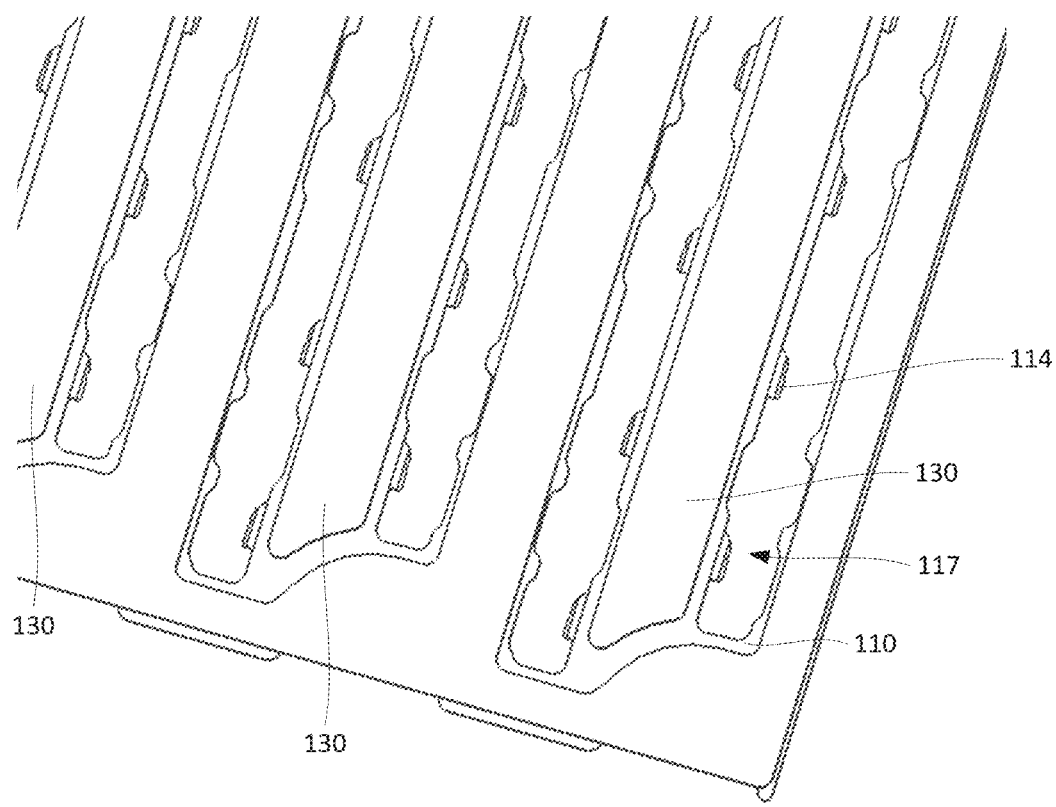

Returning to FIG. 8, in some examples, method 800 comprises laminating (block 814) first conductive layer 130 to first insulating layer 110. For example, first insulating layer 110 may comprise an adhesive surface to which first conductive layer 130 adheres. One example of a subassembly comprising first conductive layer 130 and first insulating layer 110 is presented in FIG. 10C. As noted above, first insulating layer 110 provides support to disjoined portions of first conductive layer 130.

Figure 10D:
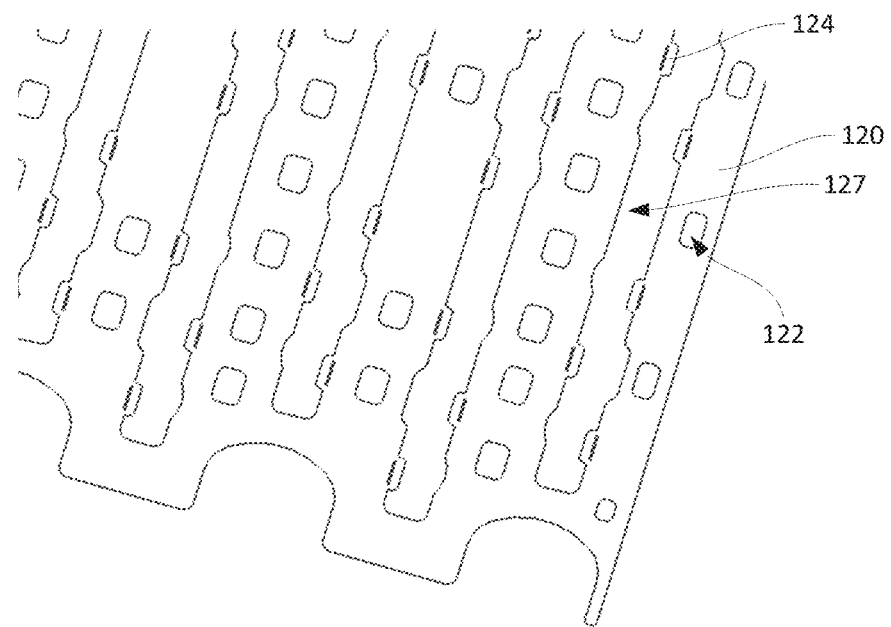

Returning to FIG. 8, in some examples, method 800 comprises patterning (block 820) second insulating layer 120. One example of second insulating layer 120 is presented in FIG. 10D. For example, various openings may be formed in a continuous base film, yielding second insulating layer 120. Some openings 127 provide access to flexible tabs 142 within multilayered flexible battery interconnect 100. Other openings are welding openings 122 and are used for welding first conductive layer 130 to second conductive layer 140 as described above.

Figure 10E:
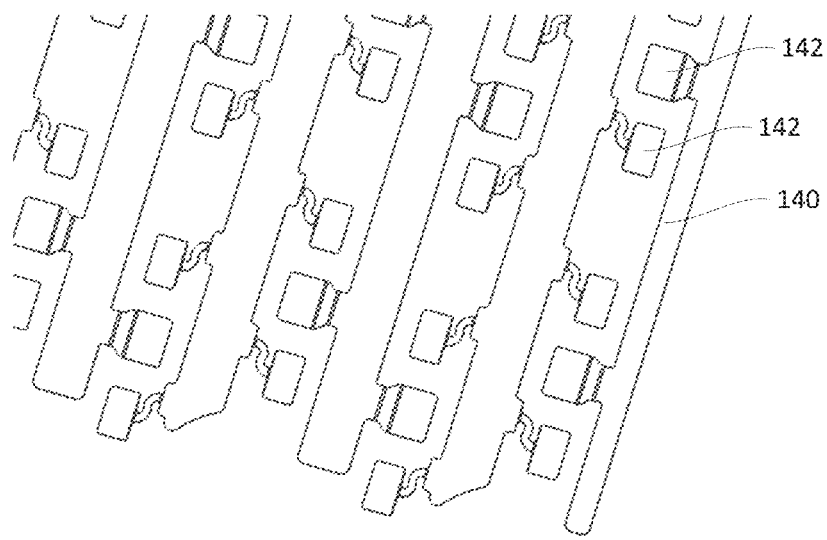

Returning to FIG. 8, in some examples, method 800 comprises patterning (block 822) second conductive layer 140. One example of second conductive layer 140 is presented in FIG. 10E. For example, separate portions of second conductive layer 140 may be formed from a continuous base metal foil, yielding second conductive layer 140. Each of these portions represents a different bus of multilayered flexible battery interconnect 100. Furthermore, each portion comprises flexible tabs 142 for making electric connections to battery cells. In some examples, second conductive layer 140 is supported on a temporary substrate (e.g., also used for patterning), at least before second conductive layer 140 is laminated to second insulating layer 120.

Figure 10F:
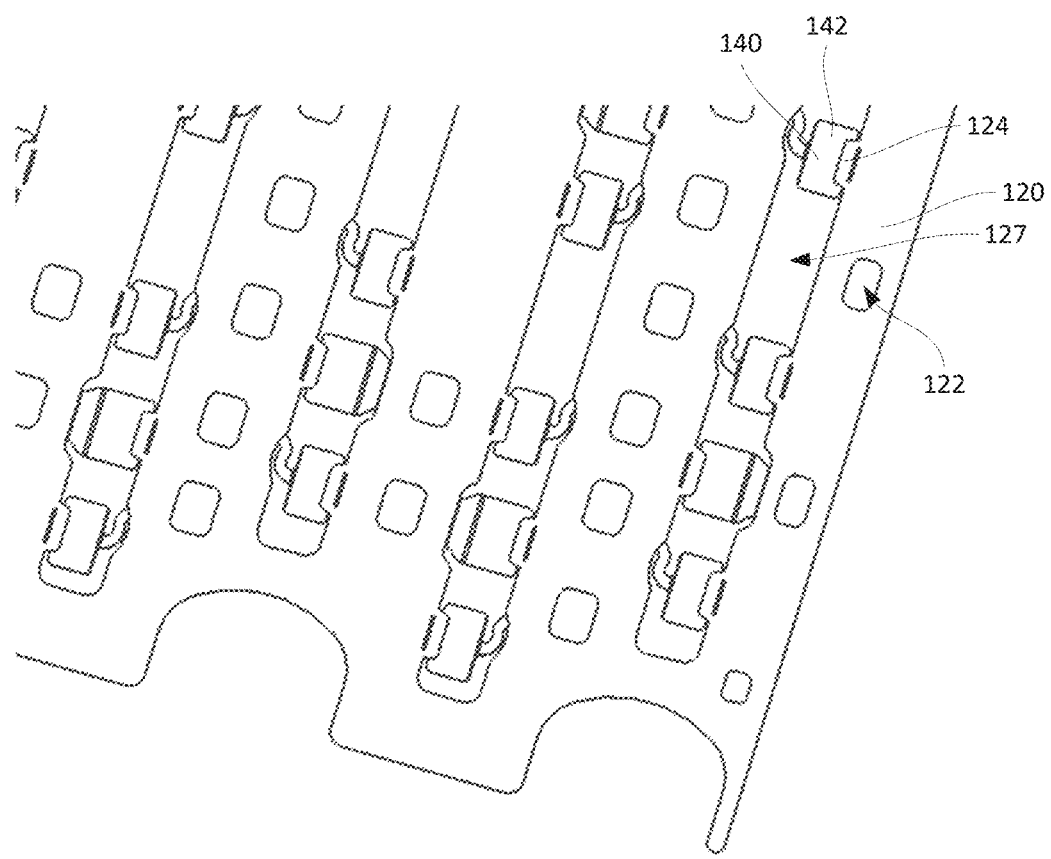

Returning to FIG. 8, in some examples, method 800 comprises laminating (block 824) second conductive layer 140 to second insulating layer 120. For example, second insulating layer 120 may comprise an adhesive surface to which second conductive layer 140 adheres. One example of a subassembly comprising second conductive layer 140 and second insulating layer 120 is presented in FIG. 10F. Second conductive layer 140 supports disjoined portions of second conductive layer 140 after this lamination operation.

Returning to FIG. 8, in some examples, method 800 comprises laminating (block 830) a stack comprising first conductive layer 130 and second conductive layer 140. First conductive layer 130 may be previously laminated to first insulating layer 110, while second conductive layer 140 may be previously laminated to second insulating layer 120. As such, first insulating layer 110 and second insulating layer 120 are also parts of this lamination stack. For example, portions of first insulating layer 110 and second insulating layer 120 extending past first conductive layer 130 and second conductive layer 140 may adhere together during this operation as, e.g., is schematically shown in FIG. 2E. A combination of first insulating layer 110, first conductive layer 130, second conductive layer 140, second insulating layer 120 may be referred to as a primary stack.

Returning to FIG. 8, in some examples, method 800 comprises welding (block 832) first conductive layer 130 and second conductive layer 140. As described above with reference to FIGS. 2A and 2B, second insulating layer 120 comprises multiple weld openings 122 which are used to access second conductive layer 140 and weld second conductive layer 140 to first conductive layer 130, thereby forming weld locations 109. For example, laser welding may be used for this purpose.

When multilayered flexible battery interconnect 100 comprises voltage traces or signal traces, provided as separate layers as, e.g., is schematically shown in FIGS. 6E and 6F, method 800 may comprise patterning (block 840) third insulating layer 160, patterning (block 842) voltage traces 150, and laminating (block 844) voltage traces 150 to third insulating layer 160 thereby forming an additional stack. Method 800 then proceed with laminating (block 850) this additional stack to the primary stack and, in some examples, welding (block 852) voltage traces 150 to one of the conductive layers, e.g., to second conductive layer 140, which may be thinner and which may be positioned on the top of first conductive layer 130 and closer to voltage traces 150.

Figure 9:
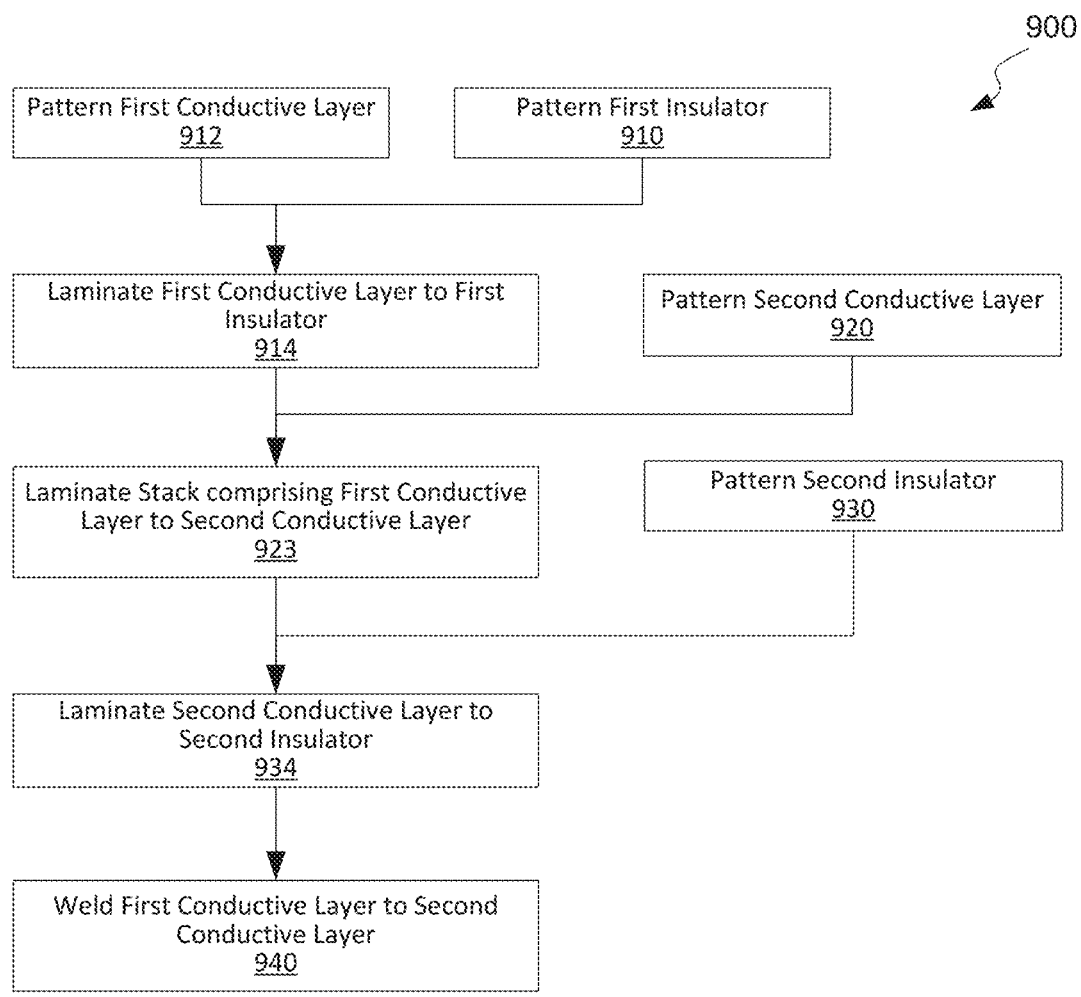
FIG. 9 is a process flowchart corresponding to another method of fabricating a multilayered flexible battery interconnect.

FIG. 9 is a process flowchart corresponding to another method 900 of fabricating multilayered flexible battery interconnect 100. Some operations of method 900 may be similar to the corresponding operations of method 800 described above. In some examples, method 900 comprises patterning (block 910) first insulating layer 110, similar to the operation represented by block 810 and described above. Method 900 comprises patterning (block 912) first conductive layer 130, similar to the operation represented by block 812 and described above. Method 900 proceeds with laminating (block 914) first insulating layer 110 to first conductive layer 130, similar to the operation represented by block 814 and described above. Furthermore, method 900 proceeds with patterning (block 920) second conductive layer 140, similar to the operation represented by block 822 and described above. Method 900 then proceeds with laminating (block 923) a stack comprising first insulating layer 110, first conductive layer 130, and second conductive layer 140. It should be noted that second insulating layer 120 is not a part of this stack. Second insulating layer 120 is added later. When second conductive layer 140 can be supported relative to first insulating layer 110 and first conductive layer 130 using portions of second conductive layer 140 extending past the boundaries of first conductive layer 130 and adhered to first insulating layer 110, e.g., a portion of flexible tabs 142 that overlap with first insulating layer 110. Method 900 comprises patterning (block 930) second insulating layer 120 (similar to the operation represented by block 820 and described above) followed by laminating (block 934) second insulating layer 120 to the stack comprising first insulating layer 110, first conductive layer 130, and second conductive layer 140 and welding (block 940) first conductive layer 130 and second conductive layer 140.

Examples of Battery Pack Connections

Figure 11A:
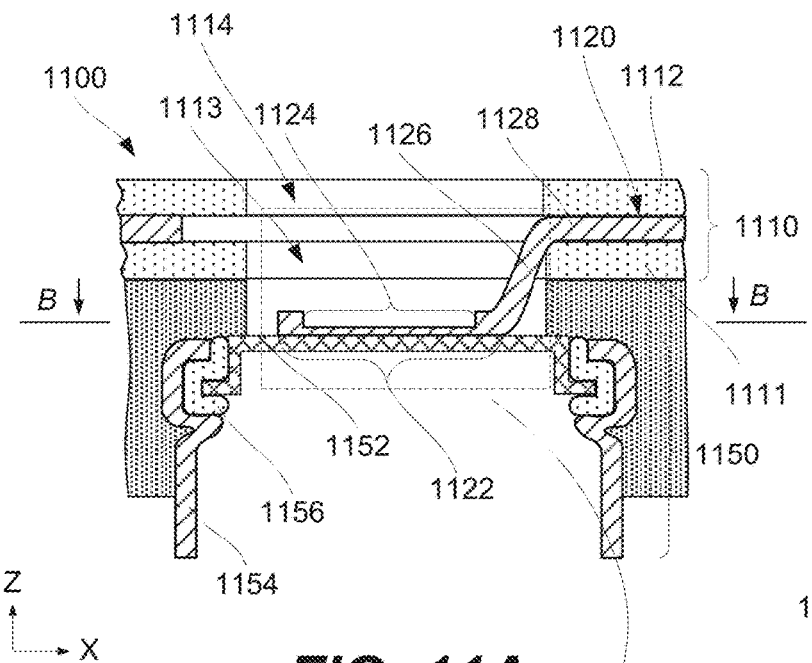
FIG. 11A is a schematic cross-sectional view of a battery pack assembly, comprising a battery and an interconnect circuit with a specially-configured connecting portion, connected to the battery, in accordance with some examples.
Figure 11A:

FIG. 11A is a schematic illustration of battery pack assembly 1100, in accordance with some examples. Battery pack assembly 1100 comprises interconnect circuit 1110 and battery 1150. While FIG. 11A illustrates only one battery 1150, one having ordinary skill in the art would understand that the same interconnect circuit 1110 may be used to connect multiple batteries, e.g., to interconnect these batteries and/or to connect to other components of battery pack assembly 1100 (e.g., inverters). Interconnect circuit 1110 comprises conductor 1120 and first insulating layer 1111. Conductor 1120 may be also referred to as a conductive element. In some examples, first insulating layer 1111 provides support to conductor 1120. For example, interconnect circuit 1110 may comprise multiple conductors, and first insulating layer 1111 supports these conductors relative to each other (e.g., to prevent shorting and to direct these conductors into desired locations). First insulating layer 1111 can be also used to insulate conductor 1120 from other components, e.g., battery 1150. In some examples, interconnect circuit 1110 comprises second insulating layer 1112 such that at least a portion of conductor 1120 is positioned between first insulating layer 1111 and second insulating layer 1112. Insulating layers may be also referred to as dielectric layers or simply dielectrics. Various examples of dielectrics and conductive elements are described above.

In some examples, first insulating layer 1111 comprises first-insulating-layer opening 1113 used, e.g., for protruding a portion of conductor 1120 when making the connection to battery 1150. Similarly, second insulating layer 1112 may comprise second-insulating-layer opening 1114 used, e.g., to access conductor 1120. For example, second-insulating-layer opening 1114 may be used to access and force the portion of conductor 1120 through first-insulating-layer opening 1113, e.g., to form an electric contact with battery 1150.

In some examples, conductor 1120 comprises conductor trace 1128, conductor neck 1126, and conductor tab 1122 such that conductor neck 1126 is positioned between and connects conductor trace 1128 and conductor tab 1122. Conductor trace 1128 extends away from first-insulating-layer opening 1113 and is used to form other electric connections to conductor 1120. Conductor tab 1122 is mechanically and electrically connected (e.g., welded) to battery 1150 as further described below. Conductor neck 1126 provides flexibility to conductor tab 1122, e.g., allowing conductor tab 1122 to be positioned out-of-plane relative to conductor trace 1128. For example, FIG. 11A illustrates conductor tab 1122 extending past the opposite side of first insulating layer 1111 relative to conductor trace 1128. In this example, conductor neck 1126 protrudes through first-insulating-layer opening 1113. Furthermore, in some examples, conductor neck 1126 allows for battery 1150 to move (e.g., to a certain extent) relative to the rest of interconnect circuit 1110 without breaking the connection between conductor tab 1122 and battery 1150.

In some examples, battery 1150 comprises battery case 1154, battery cap 1152, and battery cap insulator 1156. One having ordinary skill in the art would understand that battery 1150 comprises additional components (e.g., electrodes, electrolytes), which are not shown in FIG. 11A. Battery cap insulator 1156 supports battery cap 1152 relative to battery case 1154 and also insulates battery cap 1152 from battery case 1154. In some examples, battery case 1154 is operable as one terminal of battery 1150, while battery cap 1152 is operable as another terminal. While FIG. 11A illustrates conductor 1120 connected to battery cap 1152, one having ordinary skill in the art would understand that, in other examples, conductor 1120 may be connected to battery case 1154, e.g., to the shoulder of battery case 1154 extending around battery cap 1152 and over battery cap insulator 1156.

Figure 11B:
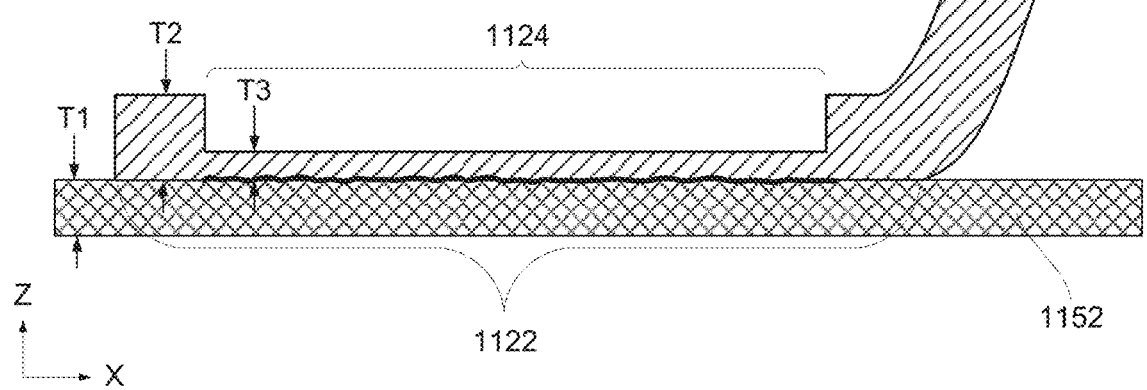
FIG. 11B is a schematic expanded cross-sectional view of a portion of the battery pack assembly in FIG. 11A, illustrating one example of the connecting portion.
Figure 12A:
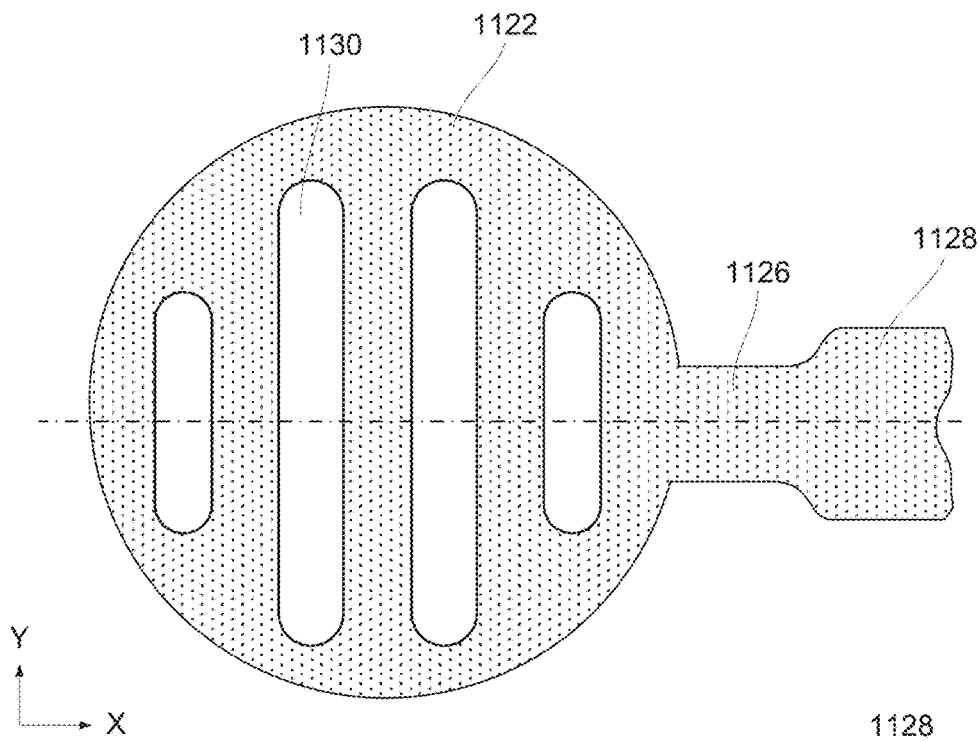
FIG. 12A is a schematic top view of the portion of a battery pack assembly, showing tab openings in a conductor tab, in accordance with some examples.
Figure 12B:
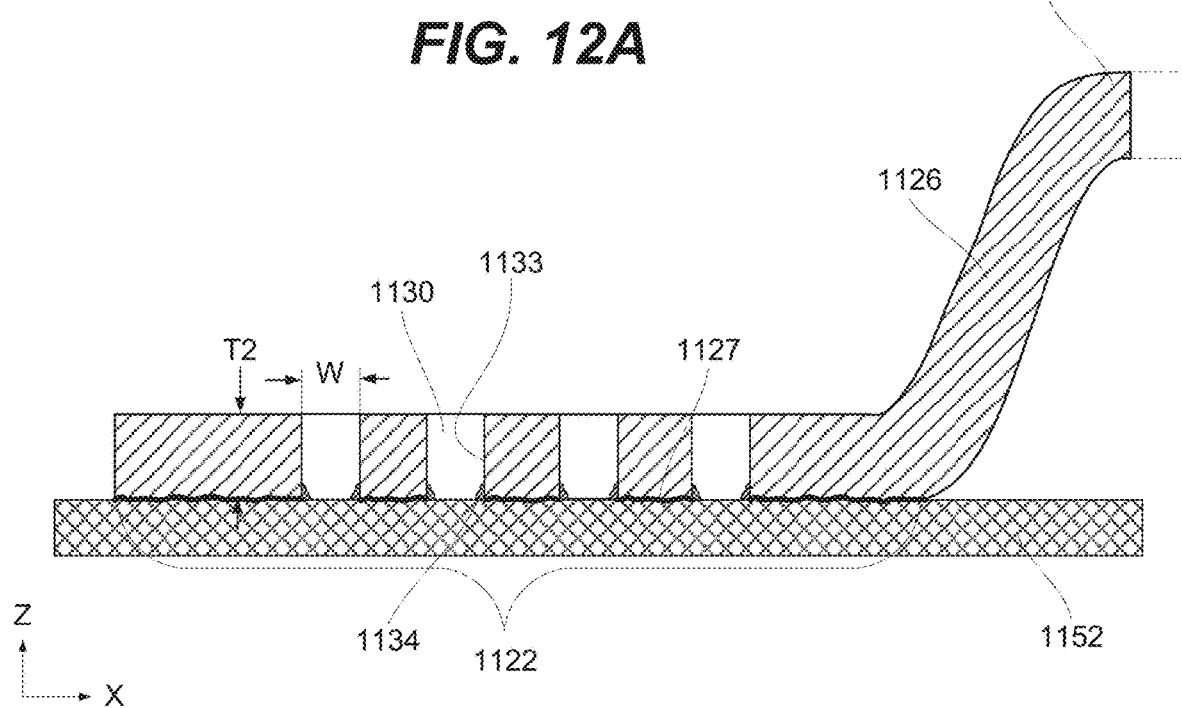
FIG. 12B is a schematic cross-sectional view of the portion of the battery pack assembly in FIG. 12A, showing the tab openings in the conductor tab, in accordance with some examples.

In some examples, conductor tab 1122 comprises connecting portion 1124, which has a thickness less than the thickness of the remaining portion of conductor tab 1122 as, e.g., is shown in FIGS. 11A and 11B. In other examples, conductor tab 1122 comprises one or more tab openings 1130 as, e.g., is shown in FIG. 12A and FIG. 12B. Conductor tab 1122 is welded to battery 1150 at connecting portion 1124 or around one or more tab openings 1130. Each one of these examples will now be described in more detail.

As noted above, FIGS. 11A and 11B illustrate an example of battery pack assembly 1100, in which conductor tab 1122 comprises connecting portion 1124, having a thickness less than the thickness of the remaining portion of conductor tab 1122. For example, conductor 1120 is formed from the same metal sheet, in which case all components of conductor 1120 (e.g., conductor trace 1128, conductor neck 1126, and conductor tab 1122) have the same thickness. As such, the thickness of conductor tab 1122 may be selected for reasons associated with other components of conductor 1120, e.g., current-carrying characteristics of conductor trace 1128. In some examples, the main thickness of conductor 1120 is at least 100 micrometers or even at least 200 micrometers. Welding such a thick sheet to battery 1150 requires significant heating of conductor 1120 and battery 1150, which may be undesirable at least from the battery perspective. For example, battery 1150 comprises various components (e.g., insulators, separators, electrolytes) that may be sensitive to high temperatures. Using connecting portion 1124, with a much lower thickness, to form an electric connection to battery 1150 allows to substantially reduce the high-temperature exposure when welding connecting portion 1124 to battery 1150.

Figure 11C:
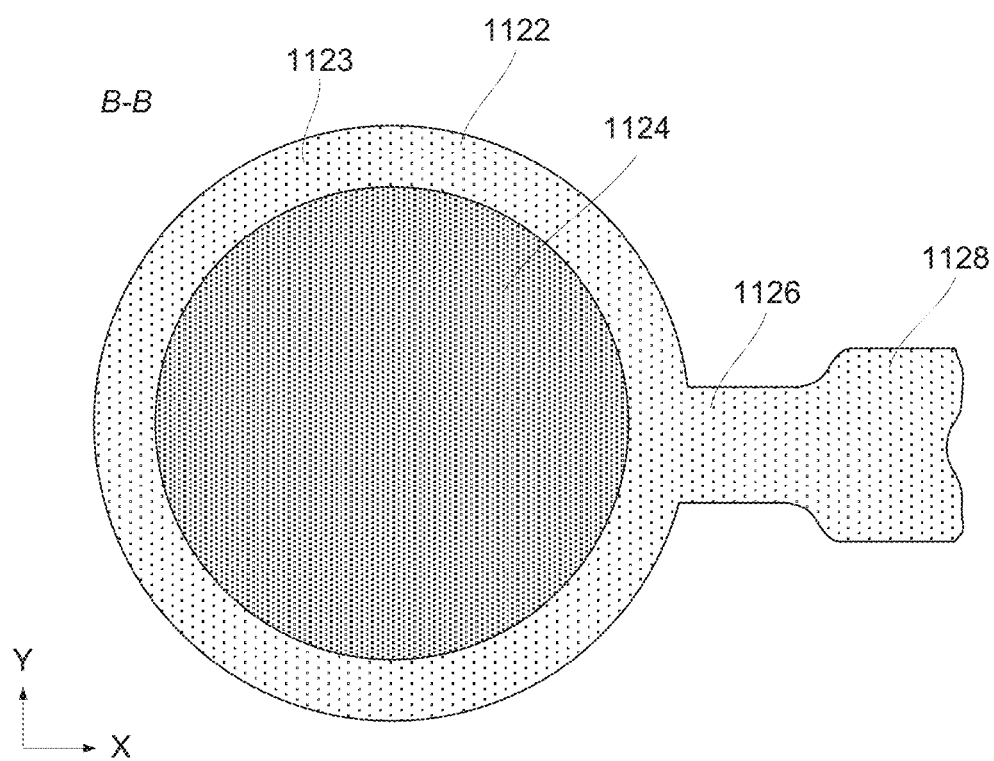
FIG. 11C is a schematic top view of the portion of the battery pack assembly in FIG. 11B.

In some examples, the thickness of connecting portion 1124 is at least twice less than the thickness of the remaining portion of conductor tab 1122 or three times less or even four times less. In some examples, connecting portion 1124 is circular as, e.g., is shown in FIG. 11C. For example, the shape (and size) of connecting portion 1124 may be the same as the battery component to which connecting portion 1124 is welded. For example, connecting portion 1124 welded to battery cap 1152 may have a circular footprint. In some examples, connecting portion 1124 is smaller than the area of the battery component to which this connecting portion 1124 is welded. More specifically, the size of connecting portion 1124 may be determined by the welding requirements, e.g., the weld nugget size. In the same or other examples, the remaining portion of conductor tab 1122 forms edge shoulder 1123, surrounding connecting portion 1124. It should be noted that the thickness of edge shoulder 1123 is the same as the main thickness of conductor 1120 and is greater than the thickness of connecting portion 1124.

As noted above, FIGS. 12A and 12B illustrate an example of battery pack assembly 1100, in which conductor tab 1122 comprises one or more tab openings 1130. Similar to connecting portion 1124, described above, tab openings 1130 allow reducing the power needed to weld conductor tab 1122 to battery 1150. For example, tab openings 1130 comprise sidewalls, which increase the surface area of conductor tab 1122 used for welding.

In some examples, each of one or more tab openings 1130 has an elongated shape as, e.g., is schematically shown in FIG. 12A. More specifically, the elongated shape extends perpendicular to conductor neck 1126 or, more specifically, to the center axis of conductor neck 1126. As shown in FIG. 12A, conductor neck 1126 extends along the X-axis, while the elongated shape of tab openings 1130 extends along the Y-axis.

Referring to FIG. 12B, in some examples, conductor tab 1122 further comprises weld nuggets 1134 disposed within each of one or more tab openings 1130 and directly interfacing battery 1150. Weld nuggets 1134 increase the interface area 1127 between conductor tab 1122 and battery 1150 by utilizing side walls 1133 of more tab openings 1130. In some examples, conductor tab 1122 is welded to battery 1150 using a resistance welder, a laser welder, and/or an ultrasonic welder. However, other attachment forms (e.g., conductive adhesives) are also within the scope.

Figure 13A:
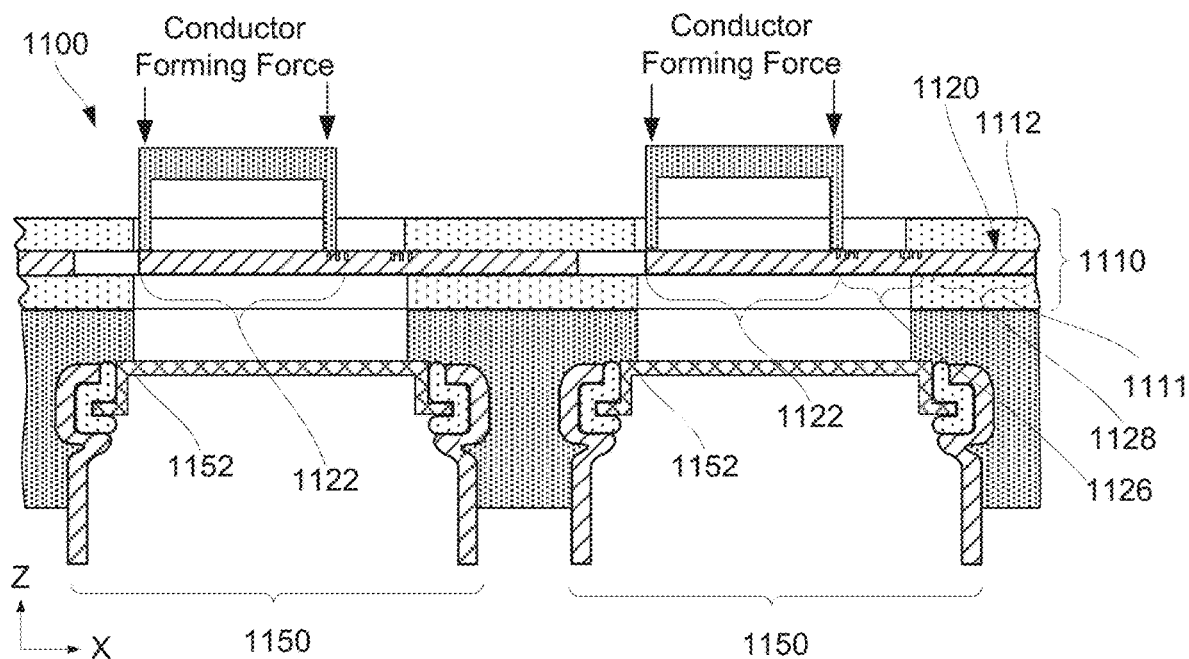
FIGS. 13A and 13B are schematic cross-sectional views of a battery pack assembly before and after forming electric connections between conductor tabs of the interconnect circuit and batteries, in accordance with some examples.
Figure 13B:
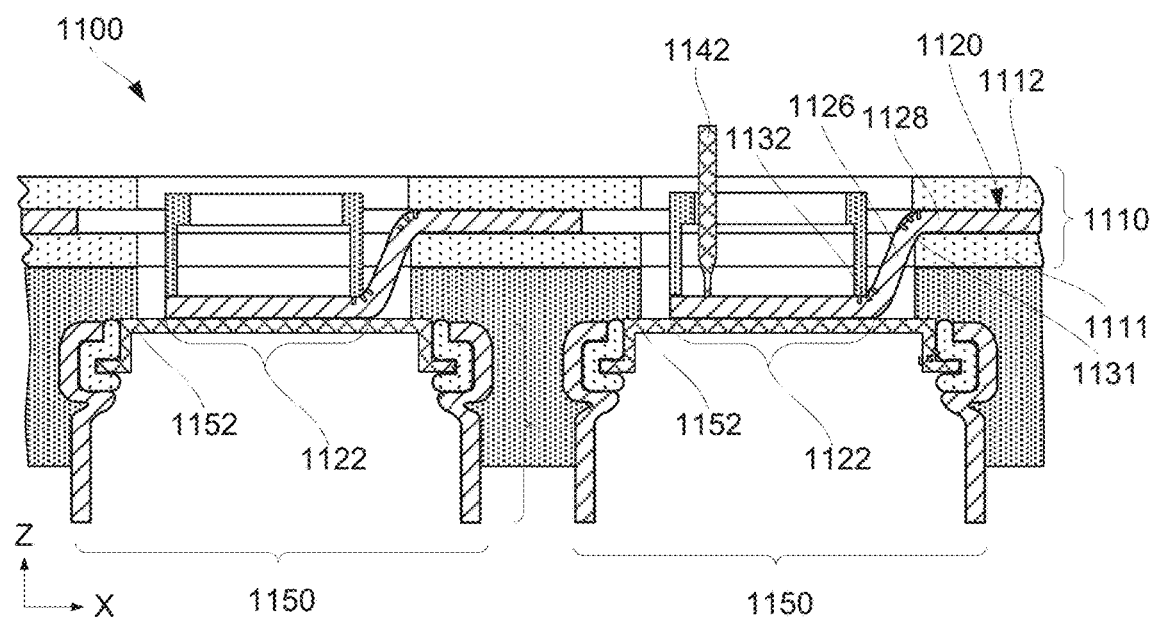

Referring to FIG. 13A, in some examples, interconnect circuit 1110 is provided as a substantially planar structure, positioned over batteries 1150. More specifically, prior to forming connections to battery 1150, conductor tab 1122 of each conductor 1120 is substantially coplanar to other components of conductor 1120 (as well as other conductors), such as conductor trace 1128 and conductor neck 1126. To form a connection to battery 1150, each conductor neck 1126 is bent such that conductor tab 1122 protrudes through first insulating layer 1111 and reaches battery 1150. For example, a press fixture, which is shown in FIG. 13A, may be used for this purpose. It should be noted that this conductor neck bending operation may be performed on tens and even hundreds of these conductor necks at the same time, e.g., the same interconnect circuit 1110 is used to connect to multiple batteries of the same battery pack. Furthermore, the thickness of conductor neck 1126 (e.g., greater than 100 micrometers or even greater than 200 micrometers) may be a significant factor in determining the force needed to bend these multiple conductor necks at the same time to form connections with the batteries. Finally, materials used for conductors 1120 (e.g., aluminum) may have a significant flexural modulus, resulting in high resistance to bending. All these factors point to large forces required to bend conductor necks 1126 when forming connections to batteries 1150, which is schematically shown in FIG. 13B. The large forces require heavy equipment and may be damaging to some components of the overall assembly (e.g., especially if there is some misalignment).

Figure 13C:
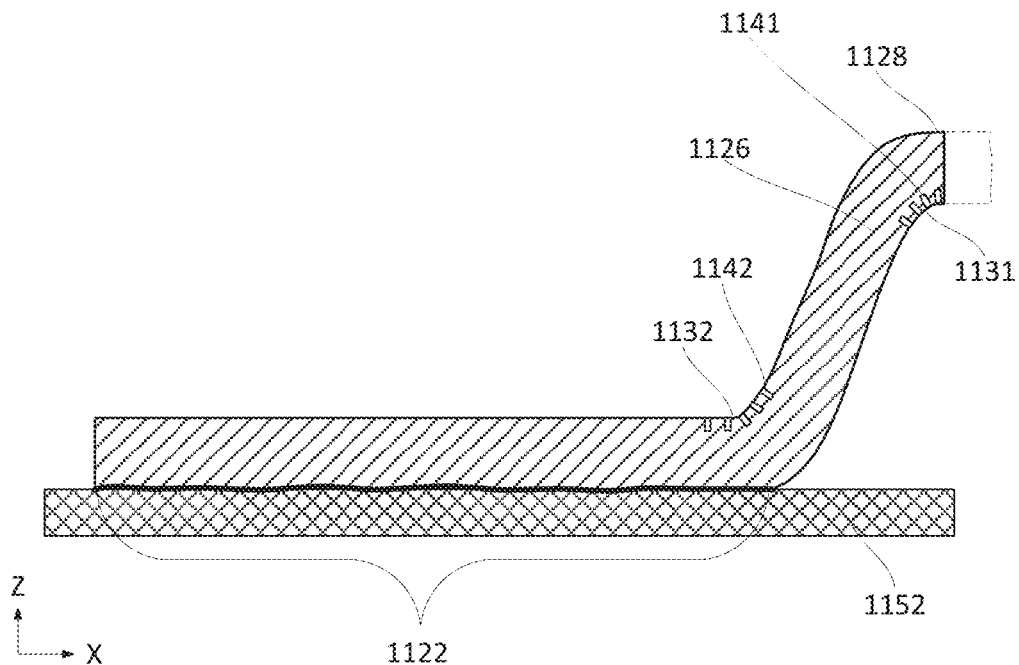
FIGS. 13C and 13D are schematic cross-sectional expanded views of two conductor necks showing different examples of partial openings in the conductor necks, providing flexibility to the conductor necks when forming connections to the batteries.
Figure 13D:
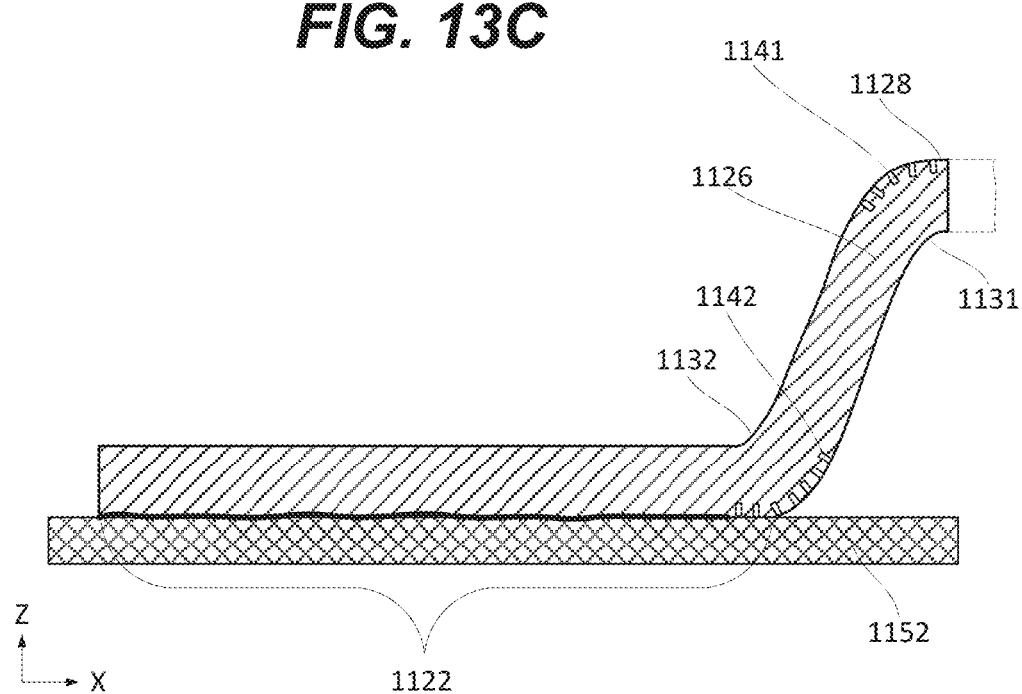

For example, FIG. 13B illustrates conductor neck 1126 extending past the edge of first insulating layer 1111 and protruding through first-insulating-layer opening 1113. Conductor neck 1126 comprises first bend 1131, proximate to conductor trace 1128, and second bend 1132, proximate to conductor tab 1122. These bends are further illustrated in FIGS. 13C and 13D. In some examples, conductor neck 1126 comprises one or more first partial openings 1141, at first bend 1131, and/or one or more second partial openings 1142, at second bend 1132. Specifically, FIG. 13C illustrates an example where five first partial openings 1141 are positioned on the inner radius of first bend 1131. FIG. 13D illustrates another example where seven first partial openings 1141 are positioned on the outer radius of first bend 1131. In some examples, first partial openings 1141 can be positioned on both sides of first bend 1131. Similarly, second partial openings 1142 may be positioned on the inner radius of second bend 1132, on the outer radius of second bend 1132, or both. Furthermore, any number of partial openings are within the scope (e.g., one, two, three, four, and so on). Increasing the number of partial openings may help to improve the flexibility of conductor neck 1126 while keeping the cross-section of each partial opening relative small. It should be noted that increasing the cross-section of partial openings increases the resistance of conductor neck 1126 and reduces the mechanical strength of conductor neck 1126. In some examples, first partial openings 1141 comprise one or more slits extending across conductor neck 1126 (between opposite edges). In more specific examples, these multiple slits have a depth of between about 10% and 40% of the total thickness of conductor neck 1126 or, more specifically, between 15% and 35% or even between 20% and 30%.

Figure 14A:
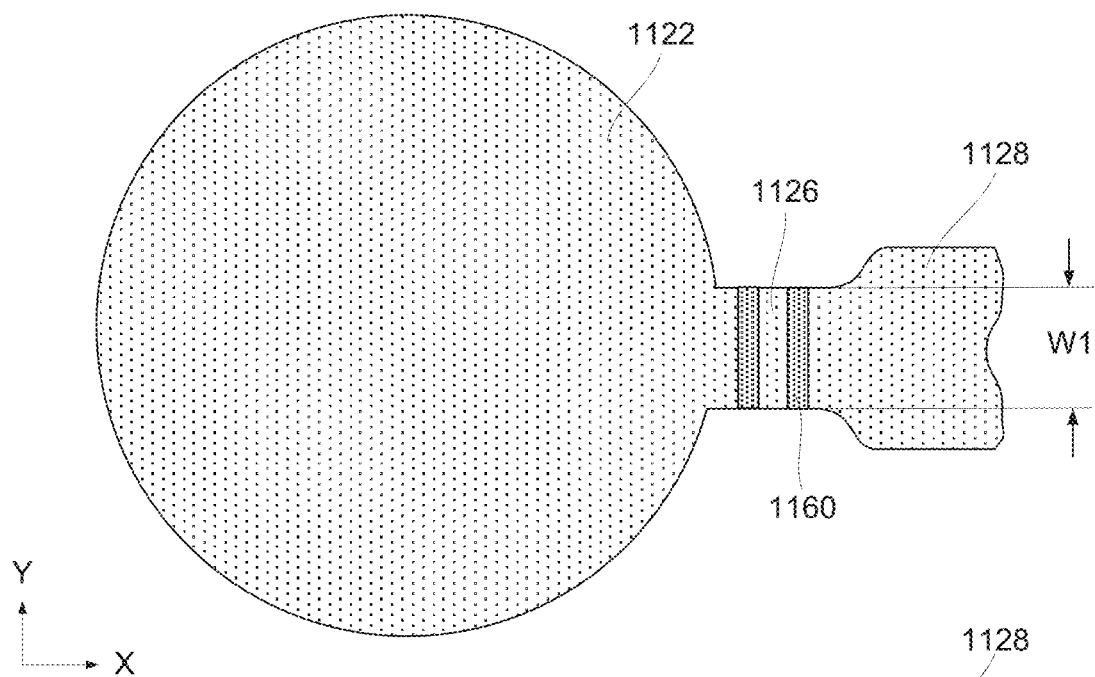
FIG. 14A is a schematic top view of a conductor of an interconnect circuit, for use in a battery pack assembly, showing partial openings in the conductor neck, operable as a fusible link.
Figure 14B:
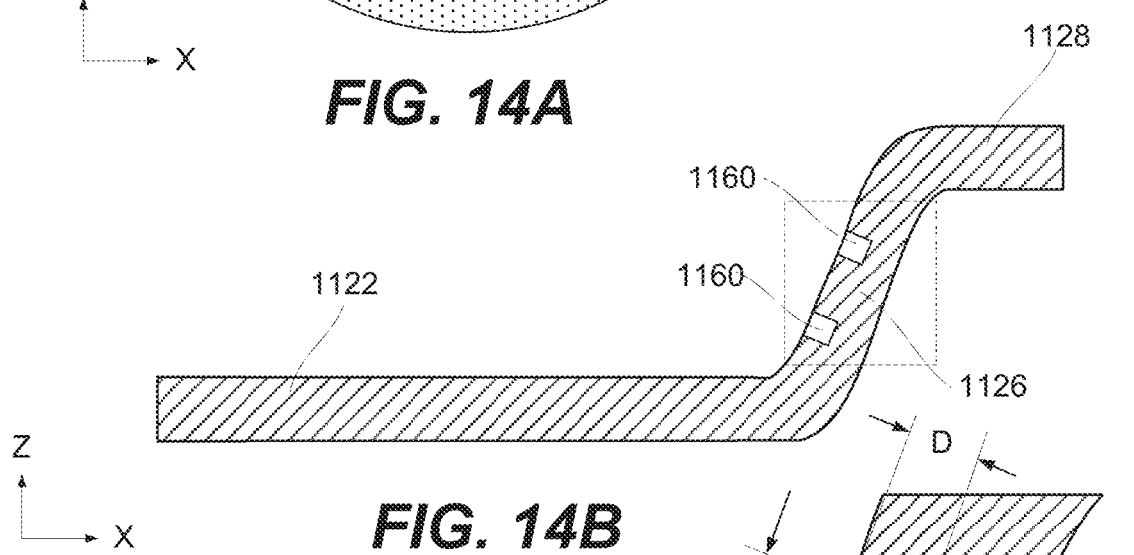
FIG. 14B is a schematic cross-sectional view of the conductor in FIG. 14A, showing the partial openings in the conductor neck.
Figure 14C:
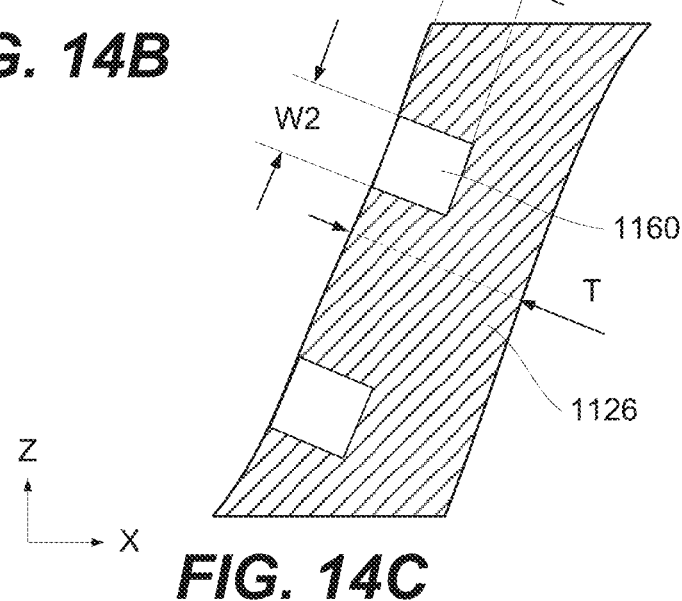
FIG. 14C is an expanded schematic cross-sectional view of the conductor in FIG. 14B, identifying various characteristics of the partial openings in the conductor neck.

In some examples, conductor neck 1126 is operable as a fusible link as, e.g., is shown in FIGS. 14A-14C. Specifically, conductor neck 1126 comprises one or more partial openings 1160, positioned away from conductor trace 1128 and conductor tab 1122. For example, partial openings 1160 are positioned on the portion of conductor neck 1126, which has a constant width (W1) as, e.g., is shown in FIG. 14A. Each of one or more partial openings 1160 has a controlled depth and a controlled width such that conductor neck 1126 is operable as a fusible link. A combination of the depth (D) and width (W2) of each opening 1160 together with the width (W1) of conductor neck 1126, the thickness (T) of conductor neck 1126 and the material of conductor neck 1126 define the resistance and the current rating of this fusible link. In other words, each opening 1160 corresponds to the smallest cross-section of conductor neck 1126. The area and the length of this cross-section are controlled by various parameters listed above, e.g., the area of the cross-section=W1*(T−D), while the length of this cross-section is the same as the width (W2) of opening 1160. In some examples, each of one or more partial openings 1160 extends across conductor neck 1126.

CONCLUSION

The methods and devices described herein may be extended to the interconnection of electronic devices in general, including, but not limited to, integrated circuits, resistors, capacitors, inductors, photovoltaic cells, and other electronic components and/or power sources.

It is to be understood that the above description is intended to be illustrative, and not restrictive. For example, the above-described examples (and/or aspects thereof) may be used in combination with each other. In addition, many modifications may be made to adapt a particular situation or material to the teachings presented herein. Dimensions, types of materials, orientations of the various components, and the number and positions of the various components described herein are intended to define parameters of some examples and are by no means limiting and are merely examples. Many examples and modifications within the spirit and scope of the claims will be apparent to those of skill in the art upon reviewing the above description.

What is claimed is:

1. A multilayered flexible battery interconnect for interconnecting batteries in a battery pack, the multilayered flexible battery interconnect comprising:
a first insulating layer;
a second insulating layer comprising a support tab;
a first conductive layer, disposed between the first insulating layer and the second insulating layer and directly interfacing the first insulating layer; and
a second conductive layer, disposed between and directly interfacing each of the first conductive layer and the second insulating layer, wherein:
the first conductive layer is thicker than the second conductive layer,
the second conductive layer comprises a plurality of flexible tabs extending past the first conductive layer for connecting to the batteries,
the support tab supports one of the plurality of flexible tabs at least before connecting to the batteries, and
while connecting to the batteries, the one of the plurality of flexible tabs is configured to adhere to the support tab while the support tab is configured to separate from the remaining portion of the second insulating layer, or the one of the plurality of flexible tabs is configured to adhere to the support tab while the support tab is configured to bend out-of-plane relative to the remaining portion of the second insulating layer; and
a voltage trace formed from a third conductive layer, wherein:
the second insulating layer extends between the third conductive layer and the second conductive layer and comprises a second-insulating layer opening,
the voltage trace is connected to the second conductive layer through the second-insulating layer opening,
the second conductive layer is connected to the first conductive layer, and
the first conductive layer forms bus bars such that one of the bus bars is electrically connected to the voltage trace.

2. The multilayered flexible battery interconnect of claim 1, wherein the first conductive layer is at least twice thicker than the second conductive layer.

3. The multilayered flexible battery interconnect of claim 1, wherein:
the first conductive layer has a thickness of at least 300 micrometers; and
the second conductive layer has a thickness of less than 150 micrometers.

4. The multilayered flexible battery interconnect of claim 1, wherein both the first conductive layer and the second conductive layer are formed from aluminum.

5. The multilayered flexible battery interconnect of claim 1, wherein the first conductive layer and the second conductive layer are formed from different materials.

6. The multilayered flexible battery interconnect of claim 1, wherein the first conductive layer and the second conductive layer are welded together at multiple welded locations, separated from each other.

7. The multilayered flexible battery interconnect of claim 6, wherein:
the second insulating layer comprises welding openings; and
each of the multiple welded locations is positioned within one of the welding openings.

8. The multilayered flexible battery interconnect of claim 1, wherein:
the first conductive layer has a uniform thickness throughout an entire boundary of the first conductive layer; and
the second conductive layer has a uniform thickness throughout an entire boundary of the second conductive layer.

9. The multilayered flexible battery interconnect of claim 1, wherein:
the plurality of flexible tabs comprises a first tab set extending in a first direction; and
the plurality of flexible tabs comprises a second tab set extending in a second direction, opposite to the first direction.

10. The multilayered flexible battery interconnect of claim 9, wherein:
any two adjacent tabs in the first tab set are spaced apart by a battery pitch of the battery pack; and
any two adjacent tabs in the second tab set are spaced apart by the battery pitch of the battery pack.

11. The multilayered flexible battery interconnect of claim 10, wherein:
each the plurality of flexible tabs comprises a contact pad and a fusible link, connecting and supporting the contact pad relative to a remaining part of the second conductive layer; and
the contact pad is configured to connect to a center contact of one of the batteries.

12. The multilayered flexible battery interconnect of claim 11, wherein:
the second insulating layer comprises a contact opening; and
the fusible link and a majority of the contact pad protrude into the contact opening.

13. The multilayered flexible battery interconnect of claim 12, wherein:
the support tab, at least partially defines the contact opening; and
a portion of the contact pad is adhered to the support tab.

14. The multilayered flexible battery interconnect of claim 13, wherein:
the second insulating layer comprises a flexibility slit, extending along an interface between the support tab and a remaining portion of the second insulating layer.

15. The multilayered flexible battery interconnect of claim 9, wherein:
any two adjacent tabs in the first tab set are spaced apart by a battery pitch or a double of the battery pitch of the battery pack; and any two adjacent tabs in the second tab set are spaced apart by a battery pitch or a double of the battery pitch of the battery pack.

16. The multilayered flexible battery interconnect of claim 15, wherein:
each tab in the first tab set and the second tab set comprises a contact pad and a flexible neck, connecting and supporting the contact pad relative to a remaining part of the tab; and
the contact pad is configured to simultaneously connect to edge contacts of two adjacent ones of the batteries.

17. The multilayered flexible battery interconnect of claim 16, wherein:
the second insulating layer comprises a contact opening; and
the flexible neck and a majority of the contact pad protrude into the contact opening.

18. The multilayered flexible battery interconnect of claim 17, wherein:
the support tab at least partially defines the contact opening; and
a portion of the contact pad is adhered to the support tab.

19. The multilayered flexible battery interconnect of claim 18, wherein:
the second insulating layer comprises a flexibility slit, extending along an interface between the support tab and a remaining portion of the second insulating layer.

20. The multilayered flexible battery interconnect of claim 1, wherein the first insulating layer and the second insulating layer directly adhere to each other forming a boundary around portions of the first conductive layer and the second conductive layer.

21. The multilayered flexible battery interconnect of claim 1, further comprising a third insulating layer that isolates the voltage trace from environment and supports the voltage trace relative to the second insulating layer.

22. The multilayered flexible battery interconnect of claim 1, wherein the second insulating layer further comprises a flexibility slit extending along an interface between the support tab and a remaining portion of the second insulating layer.

23. The multilayered flexible battery interconnect of claim 1, wherein, while connecting to the batteries, the one of the plurality of flexible tabs is configured to adhere to the support tab while the support tab is configured to separate from the remaining portion of the second insulating layer.

24. The multilayered flexible battery interconnect of claim 1, wherein, while connecting to the batteries, the one of the plurality of flexible tabs is configured to adhere to the support tab while the support tab is configured to bend out-of-plane relative to the remaining portion of the second insulating layer.

* * * * *